US010761267B2

(12) United States Patent
Jollivet et al.

(10) Patent No.: US 10,761,267 B2
(45) Date of Patent: Sep. 1, 2020

(54) MODE MIXING OPTICAL FIBERS AND METHODS AND SYSTEMS USING THE SAME

(71) Applicant: Nufern, East Granby, CT (US)

(72) Inventors: Clemence Jollivet, Ellington, CT (US); Kevin Farley, South Windsor, CT (US); Jaroslaw Abramczyk, Farmington, CT (US); Michael Conroy, East Granby, CT (US); Kanishka Tankala, South Windsor, CT (US)

(73) Assignee: Nufem, East Granby, CT (US)

( * ) Notice: Subject to any disclaimer, the term of this patent is extended or adjusted under 35 U.S.C. 154(b) by 0 days.

(21) Appl. No.: 15/752,546

(22) PCT Filed: Aug. 12, 2016

(86) PCT No.: PCT/US2016/046931

§ 371 (c)(1),
(2) Date: Feb. 13, 2018

(87) PCT Pub. No.: WO2017/027862

PCT Pub. Date: Feb. 16, 2017

(65) Prior Publication Data

US 2019/0011637 A1 Jan. 10, 2019

Related U.S. Application Data

(60) Provisional application No. 62/204,900, filed on Aug. 13, 2015.

(51) Int. Cl.
*G02B 6/26* (2006.01)
*G02B 6/14* (2006.01)
(Continued)

(52) U.S. Cl.
CPC .......... *G02B 6/14* (2013.01); *G02B 6/02338* (2013.01); *G02B 6/036* (2013.01);
(Continued)

(58) Field of Classification Search
CPC ...... G02B 6/14; G02B 6/264; G02B 6/02338; G02B 6/036; H01S 3/06754
See application file for complete search history.

(56) References Cited

U.S. PATENT DOCUMENTS 4,372,645 A * 2/1983 Miller .................. C03B 37/023 385/123
4,877,305 A 10/1989 Ricciardelli
(Continued)

FOREIGN PATENT DOCUMENTS

EP 0918382 A2 * 5/1999 ......... G02B 6/03622
WO WO 02/091046 11/2002
(Continued)

OTHER PUBLICATIONS

Farley et al., "Optical fiber designs for beam shaping," Optomechatronic Micro/Nano Devices and Components III: Oct. 8-10, 2007, Lausanne, Switzerland; [Proceedings of SPIE, ISSN 0277-786X], SPIE, Bellingham, Wash, vol. 8961, Mar. 11, 2014, pp. 89612U-89612U, XP060034263.
(Continued)

*Primary Examiner* — Ellen E Kim
(74) *Attorney, Agent, or Firm* — McDonnell Boehnen Hulbert & Berghoff LLP

(57) ABSTRACT

The present disclosure relates more to mode mixing optical fibers useful, for example in providing optical fiber laser outputs having a desired beam product parameter and beam profile. In one aspect, the disclosure provides a mode mixing optical fiber for delivering optical radiation having a wavelength, the mode mixing optical fiber having an input end, an
(Continued)

output end, a centerline and a refractive index profile, the mode mixing optical fiber comprising: an innermost core, the innermost core having a refractive index profile; and a cladding disposed about the innermost core, wherein the mode mixing optical fiber has at least five modes at the wavelength, and wherein the mode mixing optical fiber is configured to distribute a fraction of the light input at its input end from its lower-order modes to its higher-order modes.

19 Claims, 21 Drawing Sheets

(51) Int. Cl.

| | |
|---|---|
| ***H01S 3/08*** | (2006.01) |
| ***H01S 3/067*** | (2006.01) |
| ***G02B 6/036*** | (2006.01) |
| ***G02B 6/02*** | (2006.01) |
| *G02B 6/42* | (2006.01) |
| *G02B 27/09* | (2006.01) |

(52) U.S. Cl.

CPC ......... *G02B 6/03605* (2013.01); *G02B 6/264* (2013.01); *H01S 3/067* (2013.01); *H01S 3/06729* (2013.01); *H01S 3/06754* (2013.01); *H01S 3/0804* (2013.01); *G02B 6/421* (2013.01); *G02B 27/0927* (2013.01); *H01S 3/06737* (2013.01)

(56) References Cited

U.S. PATENT DOCUMENTS

| | | | | |
|---|---|---|---|---|
| 5,138,675 | A | 8/1992 | Schofield | |
| 5,533,163 | A | 7/1996 | Muendel | |
| 5,790,735 | A * | 8/1998 | Oleskevich | C03B 37/01234 372/6 |
| 6,064,786 | A | 5/2000 | Cunningham | |
| 6,157,763 | A | 12/2000 | Grubb | |
| 6,480,659 | B1 * | 11/2002 | Patlakh | G02B 6/02228 372/6 |
| 6,483,973 | B1 | 11/2002 | Mazzarese | |
| 7,050,686 | B2 * | 5/2006 | Farroni | G02B 6/024 382/124 |
| 7,317,857 | B2 | 1/2008 | Manyam | |
| 7,606,273 | B2 * | 10/2009 | Zhu | H01S 3/067 372/29.011 |
| 7,676,129 | B1 * | 3/2010 | Bookbinder | G02B 6/02019 385/123 |
| 8,731,358 | B2 * | 5/2014 | Pare | G02B 6/02023 385/126 |
| 9,025,239 | B2 * | 5/2015 | Zhu | H01S 3/06754 359/341.1 |
| 2003/0152349 | A1 | 8/2003 | Lauzon et al. | |
| 2004/0036955 | A1 | 2/2004 | Digonnet et al. | |
| 2006/0204190 | A1 | 9/2006 | Ranka | |
| 2008/0219299 | A1 | 9/2008 | Lewis | |
| 2010/0007985 | A1 | 1/2010 | Dong | |
| 2012/0069861 | A1 | 3/2012 | Neuberger | |
| 2015/0077837 | A1 | 3/2015 | Abedin | |
| 2016/0294152 | A1 | 10/2016 | Bhawalkar | |
| 2019/0011637 | A1 | 1/2019 | Jollivet | |

FOREIGN PATENT DOCUMENTS

| | | |
|---|---|---|
| WO | WO 03/098295 | 11/2003 |
| WO | 2010/057288 A1 | 5/2010 |

OTHER PUBLICATIONS

International Search Report dated Nov. 29, 2016 of International Application No. PCT/US2016/046931 filed Aug. 12, 2016, 4 pages.

* cited by examiner

MODE MIXING OPTICAL FIBERS AND METHODS AND SYSTEMS USING THE SAME

CROSS-REFERENCE TO RELATED APPLICATIONS

This application is a U.S. national phase application of International Patent Application no. PCT/US2016/046931, filed Aug. 12, 2016. International Patent Application no. PCT/US2016/046931 claims the benefit of priority of U.S. Provisional Patent Application No. 62/204,900, filed Aug. 13, 2015, which is hereby incorporated herein by reference in its entirety.

BACKGROUND OF THE DISCLOSURE

1. Field of the Disclosure

The present disclosure relates generally to optical fibers and optical fiber lasers. The present disclosure relates more particularly to mode mixing optical fibers useful, for example in providing optical fiber laser outputs having a desired beam product parameter and beam profile.

2. Technical Background

High power optical lasers and amplifiers are widely used in a variety of industries for a variety of purposes, such as laser cutting, welding and machining of various materials. Research and development in rare-earth doped optical fibers along with the discovery of specialty fiber designs such as Large-Mode Area (LMA) fibers has triggered the introduction of a variety of high power fiber laser and amplifier modules. Multi-kW fiber lasers and amplifiers have been realized with very high efficiencies and are fueling the growth of laser material processing. Of course, other types of high power lasers, such as solid-state lasers, are also commonly used in materials processing applications.

Lasers and amplifiers used in the field of materials processing desirably fulfill specific requirements in terms of output power and beam profile. In terms of power, the laser or amplifier system desirably delivers radiation with a wavelength and an energy that is high enough to process a desired material, typically on the order of kilowatts. Two sorts of kW-level fiber lasers can be distinguished: multi-mode and single-mode. Single-mode fiber lasers typically deliver on the order of 1-3 kW of optical power, while multi-mode fiber lasers typically operate in the range of several tens of kW of output power. For material processing applications, both single mode and multi-mode fiber lasers are used. A multi-mode laser can be configured, for example, by using a multi-mode active fiber, or by combining the outputs of several single mode fiber lasers into a multi-mode delivery fiber for delivery to a workpiece. Similarly, a multi-mode delivery fiber is often used to deliver power from a solid-state laser to a workpiece.

In terms of beam profile, users typically desire the delivered beam to have a desired Beam Parameter Product (BPP). As used herein, the BPP is defined as the product of the beam radius R and the divergence angle of the beam θ, expressed in units of mm·mrad. The beam radius R in mm is defined as half of the Beam Diameter measured at 13.5% of the maximum intensity as the beam emerges from the optical fiber. The divergence angle θ in mrad is defined as the half-angle formed with the optical axis as the beam propagates from the end of a beam delivery optical fiber. While desired BPP values will vary from application to application, three typical ranges of BPP values for fiber-coupled lasers are provided below:

1.5 to 2 mm·mrad for a 50 μm core diameter beam delivery cable 3 to 4 mm·mrad for a 100 μm core diameter beam delivery cable 6 to 8 mm·mrad for a 200 μm core diameter beam delivery cable Moreover, in many applications, the delivered beam has an intensity profile that is substantially evenly distributed along the beam. Such a "flat-top" profile is different from a Gaussian profile, in which the maximum intensity is only at the center with a relatively sharp drop-off in intensity away from the center. A "flat-top" profile can help to enable controlled and accurate cutting, welding or machining process.

In many applications, a beam with a substantially circular profile is also (or alternatively) desired.

In order to use such lasers for material processing applications while satisfying the required beam parameter product (BPP), conventional optical fiber laser and amplifier systems have a single mode or multi-mode laser or amplifier output coupled into a beam delivery cable for transmission of the output to a workpiece. Similarly, conventional solid-state lasers are coupled to a beam delivery cable for transmission of the laser output to a workpiece. Commonly used beam delivery cables are made with highly multi-mode step-index fibers with typical core diameters of 50, 100, 200, 400 and 600 microns and numerical apertures (NA) varying from 0.1 to 0.4 (and often greater than 0.4). A number of techniques have been attempted to provide both a desired BPP and a desired flat-top profile, such as offset splicing between a single mode laser output (launch fiber) and the beam delivery cable, beam delivery optical fibers with shaped cores, external beam shaping techniques, mechanical fiber micro-bending, fiber tapers (adiabatic and/or abrupt), long period gratings and multimode interference in multi-mode fibers. However, each of these suffers from a number of drawbacks.

Accordingly, there remains a need for improved optical fibers, systems and methods that can, for example, provide one or more of a desired BPP value, a desired intensity profile (e.g., a "flat top" intensity profile), and a circular beam shape.

SUMMARY OF THE DISCLOSURE

In one aspect, the disclosure provides a mode mixing optical fiber for delivering optical radiation having a wavelength, the mode mixing optical fiber having a input end, an output end, a centerline and a refractive index profile. The mode mixing optical fiber includes an innermost core, the innermost core having a refractive index profile; and a cladding disposed about the innermost core, wherein the mode mixing optical fiber has at least five modes at the wavelength, and wherein the mode mixing optical fiber is configured to distribute a fraction of the light input at its input end from its lower-order modes to its higher-order modes.

In another aspect, the disclosure provides an optical system comprising:

a mode mixing optical fiber as described herein; and a first optical fiber having an output end directly optically coupled to the input end of the mode mixing optical fiber, the first optical fiber being configured to propagate optical radiation having the wavelength.

In another aspect, the disclosure provides an optical system comprising:

a mode mixing optical fiber as described herein; and an optical source (e.g., a solid state laser) optically coupled to the input end of the first mode mixing optical fiber.

In another aspect, the disclosure provides a method for providing guided radiation of the wavelength having a desired intensity profile. The method includes coupling input radiation into a first end of a mode mixing fiber as described herein, and guiding the radiation along the mode mixing optical fiber to provide guided radiation having a desired intensity profile, e.g., a flat-top intensity profile as described herein.

In another aspect, the disclosure provides a method for providing a free space-propagating optical beam, the method comprising providing an optical system as described herein;

propagating radiation of the wavelength into the mode mixing optical fiber; and propagating the free space-propagating optical beam from the output end of the mode mixing optical fiber.

These as well as other aspects, embodiments, advantages, and alternatives, will become apparent to those of ordinary skill in the art by reading the following detailed description, with reference where appropriate to the accompanying figures. Various embodiments of the optical fibers, systems and methods described herein can be useful in laser machining applications as well as in a variety of additional applications that would benefit from, for example, fiber beam control techniques.

Figure 1:
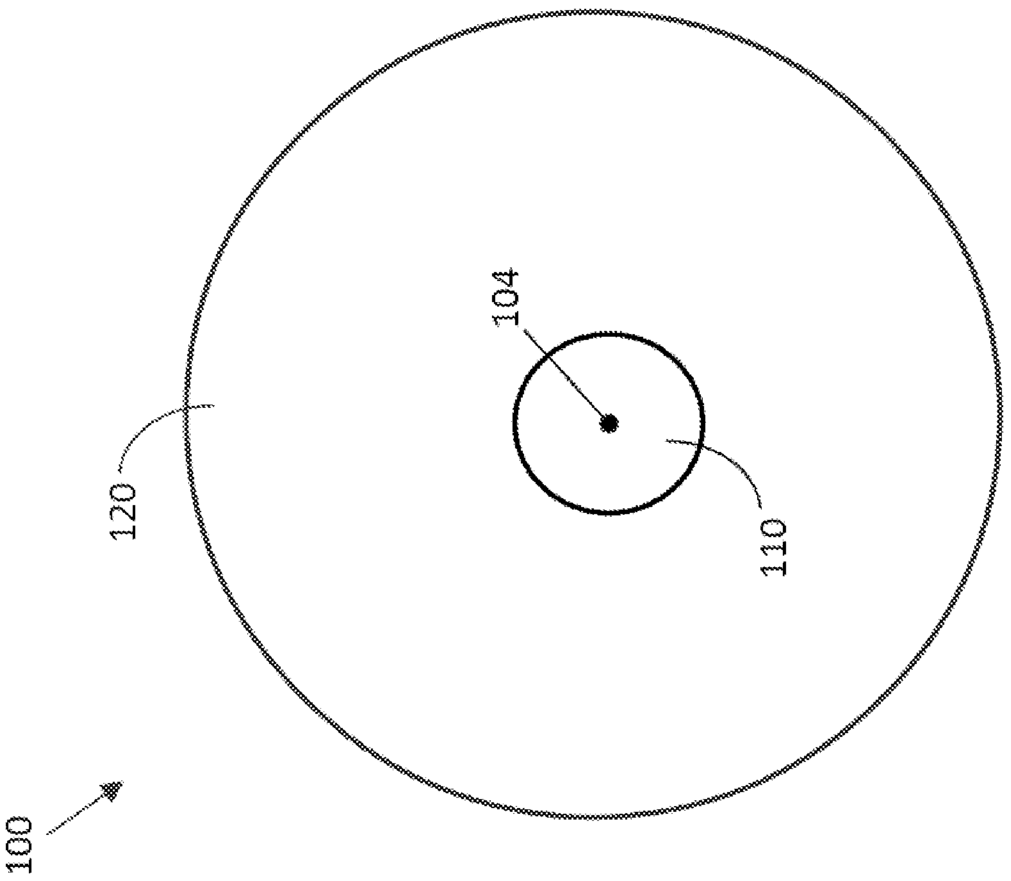
FIG. 1 is a cross-sectional schematic view and FIG. 2 is a schematic side view of a mode mixing optical fiber according to one embodiment of the disclosure.

As the person of skill in the art will appreciate, the drawings are not necessarily drawn to scale, and various elements of the system may in certain drawings be omitted for purposes of clarity.

DETAILED DESCRIPTION

In the following discussion it is assumed that the reader has the basic knowledge of the structure of optical fibers familiar to the person of skill in the art. Thus, the concepts of a fiber core, cladding, and coating are not discussed in detail. As is familiar to the person of skill in the art, radiation having a wavelength propagates generally in the core of the fiber, the diameter of which is typically in the range of a few microns to a several hundred microns, even in some embodiments up to 1500 microns. The refractive index difference between the core and the cladding acts to confine the light in one or more propagating modes, generally in the core of the fiber (although the person of ordinary skill in the art will appreciate that some energy is actually present in the cladding in the region near the core).

The terms "light" or "optical", as used herein, are used broadly as understood by one of ordinary skill in the art of optical waveguides, and are not to be limited as pertaining only to the visible range of wavelengths. Refractive indices described herein are described with reference to the wavelength of the radiation. In certain embodiments of the optical fibers, systems and methods described herein, the wavelength is in the visible or near-infrared (e.g., in the range of about 0.5 μm to about 3 μm).

The inventors have noted that in a multi-mode beam delivery fiber, if the light is uniformly distributed among all available modes (i.e., all available transverse modes), the output beam can exhibit a relatively flat-top intensity profile. Populating higher-order modes also affects the divergence angle of the output beam (since higher-order modes propagate at larger divergence angles) and increases the BPP. When all modes are evenly populated, the beam divergence equals the fiber core numerical aperture.

However, in conventional systems, all modes are not evenly populated. Rather, the number of modes excited in a multi-mode beam delivery fiber and the relative amount of power coupled in each mode is determined by, e.g., the spatial overlap between the incident laser radiation (e.g., from an active fiber) and the modes of the core of the beam delivery fiber. Since transverse modes are orthogonal, only the modes with a non-zero spatial overlap with the input laser beam (e.g., from an active fiber) can be populated. The relative amount of power carried by each mode is determined by the fraction of spatial overlap. As a result, the beam profile and the BPP available at the output of the beam delivery will vary based on the particular type of laser or amplifier being used (i.e., depending on the profile of the laser/amplifier output). For example, when using a single mode laser or amplifier source, the significant difference in size and form factor with the multi-mode step index fiber in a conventional beam delivery cables results in a low level of mode mixing (i.e., only a few lower order modes are typically populated). Use of a multi-mode laser or amplifier fiber can help matters somewhat, but due to the fact that such multi-mode laser or amplifier fibers are typically only few-moded, the beam delivery fiber still typically propagates radiation in only its lower order modes. When only lower order modes are populated, the delivered beam is typically much higher in intensity at its center than at its periphery. When coupling a solid-state laser to a beam delivery fiber, for example, through free-space optics, the beam delivery fiber can similarly transmit radiation chiefly in its lower order modes, similarly leading to a delivered beam having a more intense center.

The present inventors have addressed the drawbacks in the prior art by providing optical fibers configured to, for example, couple laser/amplifier radiation (e.g., from single-moded or few-moded fiber, or coupled from a solid-state laser) input at its input end (and propagating toward its output end) into its higher order modes. Such an optical fiber, when used as a mode transformation fiber or a beam delivery fiber in an optical fiber laser or amplifier system can provide an output having one or more of a desired BPP value, a desired intensity profile (e.g., a "flat top" intensity profile), and a circular beam shape. In certain embodiments, such mode mixing optical fibers can be provided by introducing asymmetry within the core in order to perturb the mode overlap between an input optical fiber and the mode mixing optical fiber, thereby increasing mode mixing.

As the person of ordinary skill in the art will appreciate, the optical fiber designs described herein are scalable, and offer many degrees of freedom to fulfill the needs of the end-user in terms of BPP while maintaining a desired intensity profile (e.g., a "flat top" and/or circular beam). Based on the present disclosure, the person of ordinary skill in the art can use conventional optical simulation techniques to provide additional designs within the scope of the disclosure.

Advantageously, such systems can be provided in an all-fiber monolithic configuration using standard fusion splicing procedures and conventional commercial splicing equipment. Such an all-fiber approach can offer easy and simple handling, implementation and maintenance. As the person of ordinary skill in the art will appreciate, the optical fibers, methods and systems described herein do not require external elements, spatial filtering or special treatment to be operated and to perform mode up-conversion. The optical fibers described herein can be packaged into beam delivery cables and simply spliced to the output of the laser, and thus are compatible with existing optical fiber laser and amplifier systems. Similarly, the optical fibers described herein can be coupled, for example through free-space optics, to the output of other types of lasers, such as solid-state lasers.

Figure 2:
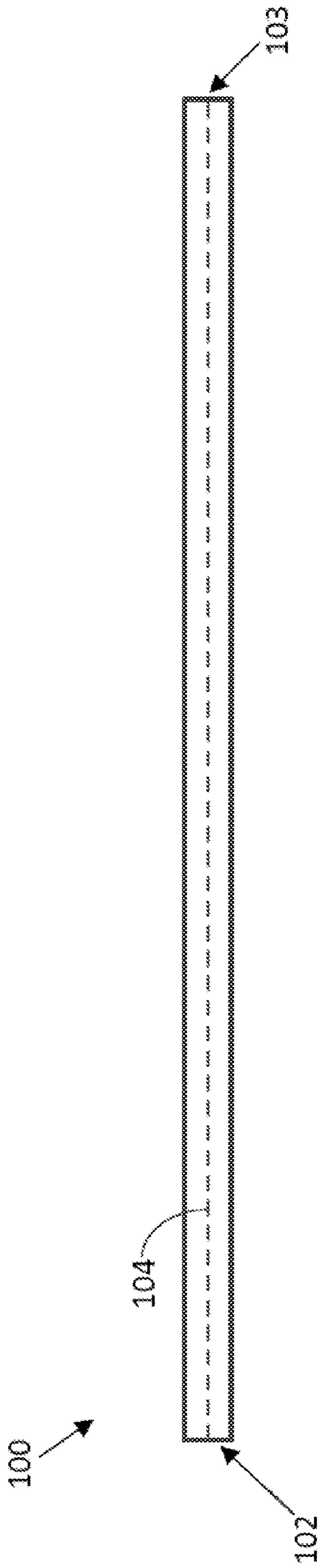

An embodiment of the disclosure is shown in cross-sectional schematic view in FIG. 1, and in schematic side view in FIG. 2. Mode mixing optical fiber 100 has an input end 102 and an output end 103. Mode mixing optical fiber 100 also has a centerline 104 (defined as the point at the geometrical center of the cross-section of an optical fiber), and a refractive index profile (defined as the refractive index as a function of position of the cross-section of an optical fiber). The mode mixing optical fiber 100 includes an innermost core 110 (which has its own refractive index profile, defined as the refractive index as a function of position of the cross-section of the innermost core of an optical fiber); and a cladding 120 disposed about the innermost core. The mode mixing optical fiber is configured to deliver optical radiation having a wavelength (i.e., from its input end to its output end). Notably, the mode mixing optical fiber has at least five modes (i.e., modes substantially confined by the innermost core) at the wavelength. For example, in certain embodiments, the mode mixing optical fiber has at least seven modes at the wavelength, or at least ten modes at the wavelength. In other embodiments, the mode mixing optical fiber has at least twenty, at least thirty, at least forty or even at least fifty modes at the wavelength.

Figure 3:
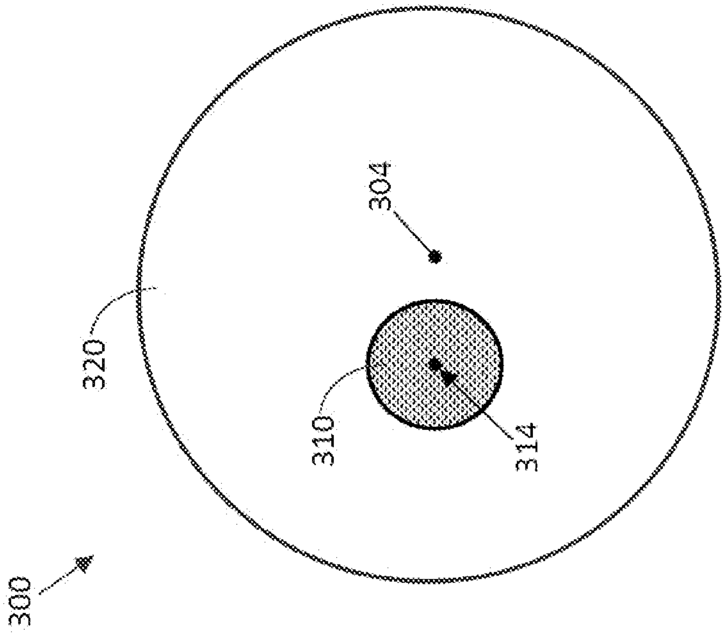
FIG. 3 is a cross-sectional schematic view of a mode mixing optical fiber according to another embodiment of the disclosure.

Critically, the mode mixing optical fiber is configured to distribute a fraction of the light input at its input end (and propagating toward its output end) from its lower-order modes to its higher-order modes. Through the distribution of optical power among not only the low-order modes but also the higher-order modes of the mode mixing optical fiber, a beam can be output from the output end of the mode mixing optical fiber that has, for example, a desired BPP and/or beam shape, such as a substantially "flat-top" profile. The present disclosure identifies a number of ways to configure a mode mixing optical fiber such that it distributes a fraction of the light input at its input end from its lower-order modes to its higher-order modes. For example, in certain embodiments of the disclosure, the innermost core of the mode mixing optical fiber has a centerline (i.e., defined as described above, but with reference to the innermost core as opposed to the overall fiber) that is positioned substantially non-collinearly with the centerline of the optical fiber. In other words, in certain embodiments, the innermost core of the mode mixing optical fiber is disposed off-center with respect to the overall mode mixing optical fiber. FIG. 3 is a cross-sectional schematic view of a mode mixing fiber 300, which has an innermost core 310 and a cladding 320 disposed around the innermost core. In this embodiment, innermost core 310 has a centerline 314 that is disposed substantially off-center with respect to the overall fiber 300. That is, the center of the innermost core 310 is laterally offset from the centerline 304 of the overall fiber 300. The lateral offset of the center of the innermost core with respect to the centerline of the fiber is at least 5 microns, for example, at least 10 microns, at least 20 microns, or at least 30 microns. In this embodiment, the mode mixing optical fiber has a step index profile; the person of ordinary skill in the art will appreciate that other index profiles may be used.

The person of ordinary skill in the art will appreciate that the innermost core of the mode mixing optical fiber can take a variety of shapes. For example, in certain embodiments, as shown in FIG. 3, the innermost core has a substantially circular cross-sectional shape. When the mode mixing optical fiber has an innermost core that is substantially circular in cross-sectional shape, it desirably includes some other feature or characteristic that can provide for the desired distribution of radiation among modes. For example, it can have a laterally-offset innermost core, as described above. In other embodiments, the innermost core can have a refractive index profile configured to distribute radiation among modes, as described in more detail below.

Figure 4:
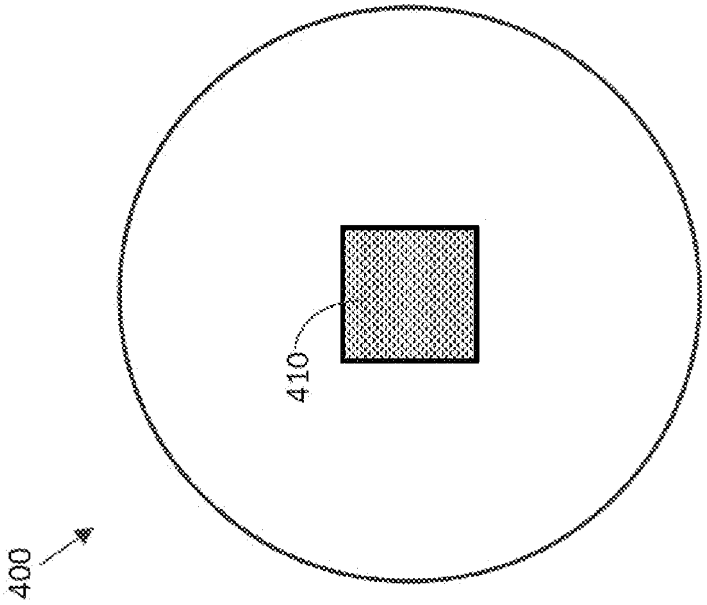
FIG. 4 is a cross-sectional schematic view of a mode mixing optical fiber according to another embodiment of the disclosure.

In other embodiments, the innermost core of the mode mixing optical fiber has a substantially non-circular cross-sectional shape. For example, mode mixing optical fiber 400, shown in cross-sectional schematic view in FIG. 4, has an innermost core 410 that has a substantially rectangular shape (here, a square). In certain embodiments, the substantially non-circular innermost core is centered along the centerline of the mode mixing optical fiber (i.e., the innermost core has a centerline that is positioned substantially collinear with the centerline of the optical fiber). But in other embodiments, the substantially-non circular innermost core is laterally offset from the centerline of the optical fiber, e.g., in any manner as described above with respect to FIG. 3. A variety of other substantially non-circular shapes can be used for the innermost core in such embodiments. For example, the innermost core can have a polygonal shape (e.g., a regular polygon or an irregular polygon), with any desirable number of sides (e.g., triangular, rectangular, pentagonal, hexagonal, octagonal). The vertices of the polygon can be sharp or somewhat rounded. Of course, a substantially non-circular innermost core need not be polygonal; it can have a rounded but non-circular shape (e.g., oval, elliptical, semicircular, etc.).

In certain embodiments, the innermost core of the mode mixing optical fiber has one or more substantially up-doped regions and/or one or more substantially down-doped regions, configured to provide the desired distribution of radiation among its propagating modes. As will be described in more detail below, the one or more substantially up-doped regions and/or one or more substantially down-doped regions can be configured in a number of ways. An up-doped region is a region that has a higher refractive index at the wavelength than the remainder of the innermost core. The person of ordinary skill in the art will appreciate that this can be due to the up-doped region having more of a high refractive index dopant, or less of a low refractive index dopant than the remainder of the innermost core. A down-doped region is a region that has a lower refractive index at the wavelength than the remainder of the innermost core. The person of ordinary skill in the art will appreciate that this can be due to the down-doped region having less of a high refractive index dopant, or more of a high refractive index dopant than the remainder of the innermost core. The person of ordinary skill in the art will appreciate that an up-doped or down-doped region need include any dopant at all, e.g., it can be substantially pure silica, in cases in which the remainder of the innermost material has a different refractive index difference.

Figure 5:
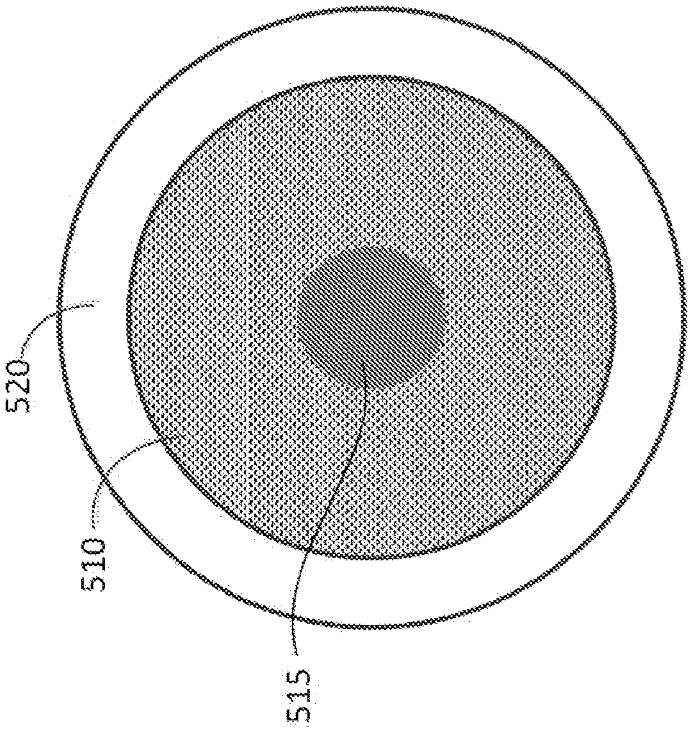
FIG. 5 is a cross-sectional schematic view of a mode mixing optical fiber according to another embodiment of the disclosure.

In certain embodiments, the innermost core of the optical fiber includes one or more substantially down-doped regions disposed symmetrically around its centerline. For example, the innermost core of the mode mixing optical fiber can include a substantially down-doped region having a centerline disposed substantially collinear with the centerline of the innermost core. One such embodiment is shown in cross-sectional schematic view in FIG. 5. Mode mixing optical fiber 500 has an innermost core 510 surrounded by a cladding 520. Innermost core 510 includes a substantially down-doped region 515, which has a centerline disposed along the centerline of the innermost core itself. Of course, in other embodiments there is no substantially down-doped region disposed symmetrically around the centerline of the innermost core.

In certain embodiments, the innermost core of the mode mixing optical fiber includes one or more substantially down-doped regions that are disposed asymmetrically around the centerline of the innermost core. Such substantially down-doped regions may be provided, for example, in combination with a down-doped region provided along the centerline of the innermost core as described above, or may be provided in the absence of a down-doped region provided along the centerline of the innermost core.

Figure 6:
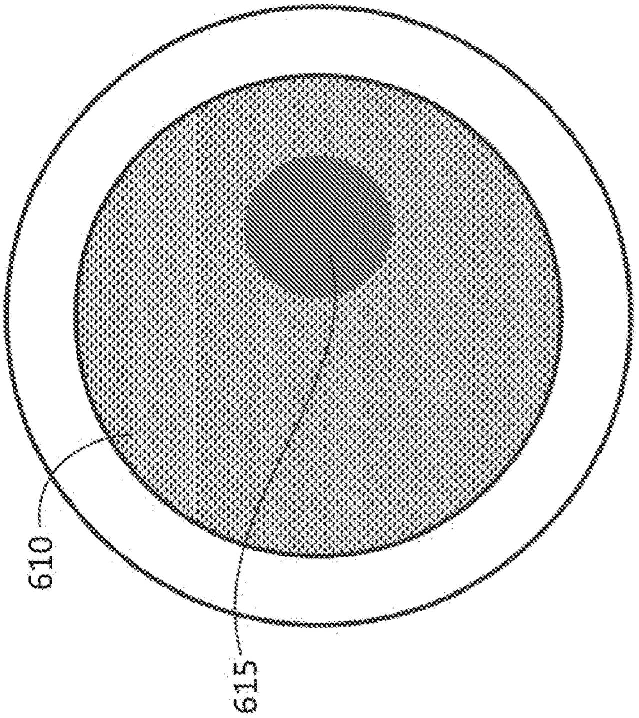
FIG. 6 is a cross-sectional schematic view of a mode mixing optical fiber according to another embodiment of the disclosure.
Figure 8:
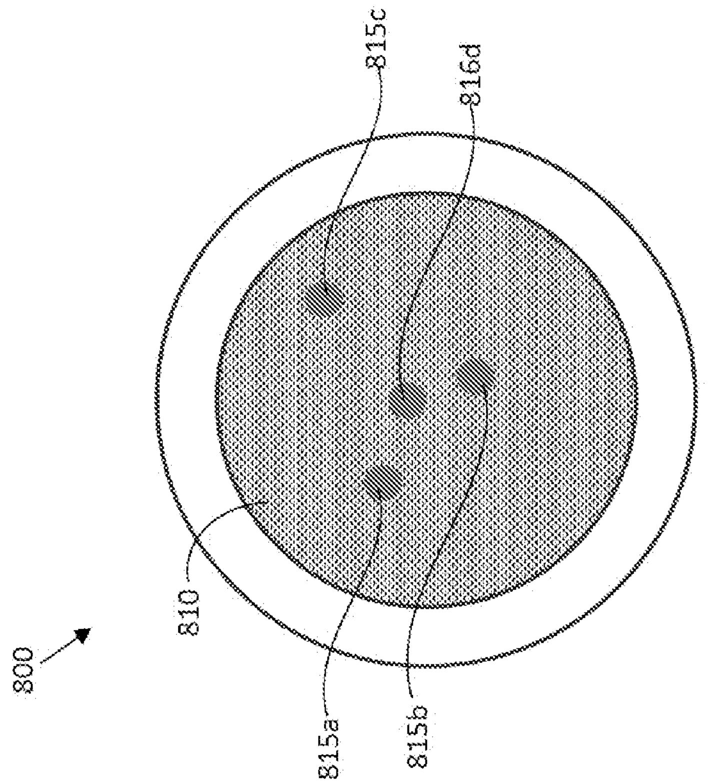
FIG. 8 is a cross-sectional schematic view of a mode mixing optical fiber according to another embodiment of the disclosure.
Figure 7:
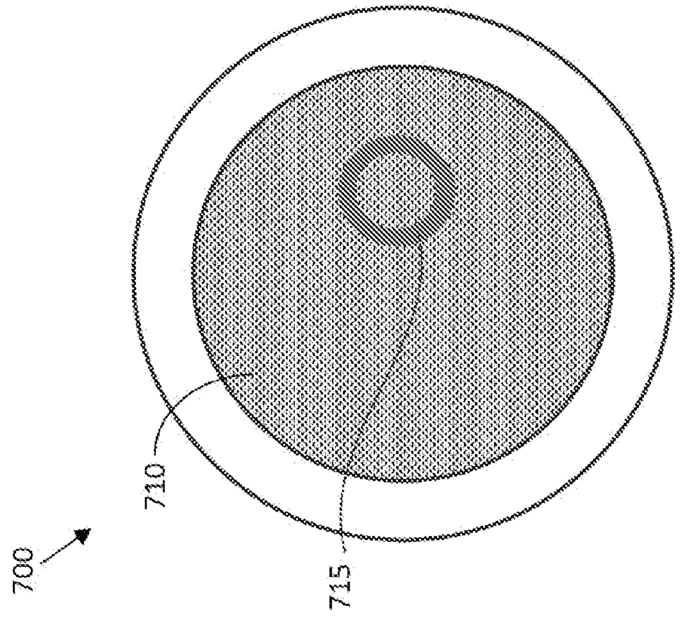
FIG. 7 is a cross-sectional schematic view of a mode mixing optical fiber according to another embodiment of the disclosure.
Figure 9:
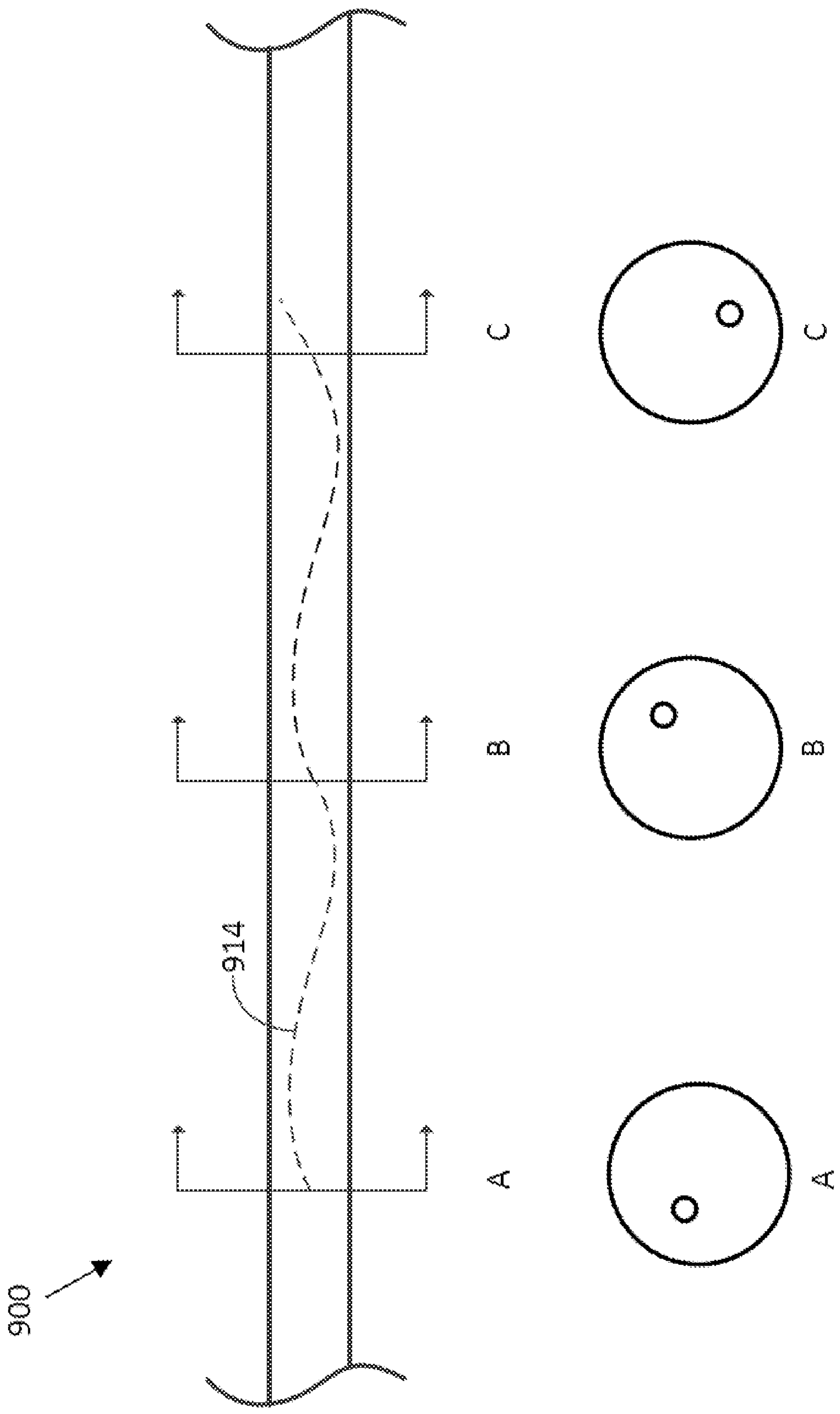
FIG. 9 is a schematic side view of a mode mixing optical fiber according to another embodiment of the disclosure.

For example, optical fiber 600, shown in cross-sectional schematic view in FIG. 6, has a innermost core 610 that includes a substantially down-doped region 615 disposed offset from the centerline of the innermost core of the optical fiber (in this embodiment, also disposed offset from the centerline of the optical fiber itself). As another embodiment, FIG. 7 is a cross-sectional schematic view of a mode mixing optical fiber. The mode mixing optical fiber 700 includes an innermost core 710, which includes a down-doped ring-shaped region 715; here, too, the down-doped region is disposed with its center offset from the center of the innermost core (and also the centerline of the fiber). FIG. 8 is a cross-sectional schematic view of yet another embodiment of a mode mixing optical fiber as described herein. Referring to FIG. 8, mode mixing optical fiber 800 includes an innermost core 810, which includes down-doped regions **815*a*, 815*b*, 815*c* and 815*d*. Here, the down-doped regions 815*a*, 815*b*, 815*c* and 815*d* are disposed with their centers at various distances away from the centerline 804** of the optical fiber. When multiple down-doped regions are provided, they may be disposed randomly, or alternatively, arranged in a regular geometrical arrangement (i.e., without forming a bandgap structure).

In certain embodiments, the innermost core of a mode mixing optical fiber includes one or more substantially up-doped regions. For example, the one or more substantially up-doped regions may be disposed asymmetrically around the centerline of the innermost core, e.g., in any of the manners described above with respect to the down-doped regions. In other embodiments, an up-doped region is disposed symmetrically around the center of the innermost core (e.g., as a ring-shaped region), but substantially towards the periphery of the innermost core (e.g., with at least ½, ⅔ or even ¾ of the area of the up-doped area disposed at least half the radius of the innermost core away from the centerline of the innermost core). If present, the one or more high-index regions can be provided in combination with one or more low-index regions as described above.

The person of ordinary skill in the art will appreciate that any number of substantially up-doped/down-doped regions can be provided in the innermost core of the optical fiber. For example, in certain embodiments, e.g., as described herein with respect to FIGS. 5, 6, 7, 9 and 23, there is only a single substantially up-doped/down-doped region in the innermost core. In other embodiments, for example, as described with respect to FIG. 8, there are a plurality of up-doped/down-doped regions. However, for the sake of simplicity of manufacture, it can be desirable to limit the number of up-doped/down-doped regions, e.g., to be no more than 12, no more than 8, no more than 5, no more than 4, or even no more than 3. When there are a plurality of up-doped/down-doped regions, they do not form a so-called photonic crystal or photonic bandgap structure having a bandgap at the wavelength.

The innermost core of the mode mixing optical fiber can be formed in a variety of sizes. For example, in certain embodiments, the innermost core of the optical fiber has a diameter (i.e., the radially-averaged distance across the innermost core) in the range of about 50 μm to about 3000 μm, e.g., in the range of about 50 μm to about 2000 μm, or about 50 μm to about 1000 μm, or about 50 μm to about 600 μm, or about 100 μm to about 3000 μm, or about 100 μm to about 2000 μm, or about 100 μm to about 1000 μm, or about 100 μm to about 600 μm, or about 200 μm to about 3000 μm, or about 200 μm to about 2000 μm, or about 200 μm to about 1000 μm, or about 200 μm to about 600 μm. The person of ordinary skill in the art will select an innermost core diameter to provide a desired number of modes and overlap with an input optical fiber.

Similarly, the overall mode mixing optical fiber may be formed in a variety of sizes. In certain embodiments, the mode mixing optical has an outer diameter in the range of about 100 μm to about 3600 μm, e.g., in the range of about 100 μm to about 3000 μm, or about 100 μm to about 2500 μm, or about 100 μm to about 1500 μm, or about 100 μm to about 1000 μm, or about 100 μm to about 800 μm, or about 100 μm to about 600 μm, or about 200 μm to about 3600 μm, or about 200 μm to about 3000 μm, or about 200 μm to about 2500 μm, or about 200 μm to about 1500 μm, or about 200 μm to about 1000 μm, or about 200 μm to about 800 μm, or about 200 μm to about 600 μm. In certain embodiments, the outer diameter of the mode mixing optical fiber is at least about 1.05 times the outer diameter of the innermost core, for example, in the range of about 1.05 to about 5 times, or about 1.05 to about 3 times, or about 1.05 to about 2 times the outer diameter of the innermost core of the mode mixing optical fiber. For example, in some embodiments, the outer diameter of the mode mixing optical fiber is at least about 1.2 times the outer diameter of the innermost core, for example, in the range of about 1.2 to about 5 times, or about 1.2 to about 3 times, or about 1.2 to about 2 times the outer diameter of the innermost core of the mode mixing optical fiber.

As the person of ordinary skill in the art will appreciate, the various up-doped and down-doped regions may be provided in a variety of shapes and a variety of sizes. In certain embodiments, the various up-doped and/or down-doped regions have a solid cross-sectional shape selected from circular, non-circular but rounded (e.g., oval, ellipse, hemicircular), polygonal (e.g., triangular, hexagonal, square). The various up-doped and/or down-doped regions can also be provided as annular shapes (e.g., circular rings, annular non-circular but rounded shapes, or annular polygons). The various up-doped and/or down-doped regions can be, for example, at least about the size of the wavelength (i.e., in radially-averaged cross-sectional width). In certain embodiments, the various up-doped and/or down-doped regions are, for example in the range of about 1 μm to about 2000 μm in size, e.g., in the range of about 1 μm to about 1500 μm, or about 1 μm to about 1000 μm, or about 1 μm to about 800 μm, or about 1 μm to about 600 μm, or about 1 μm to about 400 μm, or about 1 μm to about 200 μm, or about 2 μm to about 2000 μm, or about 2 μm to about 1500 μm, or about 2 μm to about 1000 μm, or about 2 μm to about 800 μm, or about 2 μm to about 600 μm, or about 2 μm to about 400 μm, or about 2 μm to about 200 μm, or about 5 μm to about 2000 μm, or about 5 μm to about 1500 μm, or about 5 μm to about 1000 μm, or about 5 μm to about 800 μm, or about 5 μm to about 600 μm, or about 5 μm to about 400 μm, or about 5 μm to about 200 μm, or about 15 μm to about 2000 μm, or about 15 μm to about 1500 μm, or about 15 μm to about 1000 μm, or about 15 μm to about 800 μm, or about 15 μm to about 600 μm, or about 15 μm to about 400 μm, or about 15 μm to about 200 μm. In certain embodiments, the total percentage of innermost core area of the up- and/or down-doped regions is in the range of about 5% to about 95%, e.g., in the range of about 5% to about 85%, or about 5% to about 75%, or about 5% to about 50%, or about 5% to about 25%, or about 10% to about 95%, or about 10% to about 85%, or about 10% to about 75%, or about 10% to about 50%, or about 10% to about 25%, or about 1% to about 10%, or about 1% to about 20%, or about 1% to about 25%.

The one or more substantially up-doped and/or down-doped regions have a refractive index that is substantially different from that of the remainder of the innermost core. For example, the substantially-up doped regions can have a refractive index (i.e., at the wavelength) that is at least about 0.001, at least about 0.002, at least about 0.003, or even at least about 0.005 greater than that of the remainder of the innermost core, e.g., at least about 0.01 or at least about 0.02 greater than that of the remainder of the innermost core. Similarly, the substantially down-doped regions can have a refractive index that is at least about 0.001, at least about 0.002, at least about 0.003, or even at least about 0.005 less than that of the remainder of the innermost core, e.g., at least about 0.01 or at least about 0.02 less than that of the remainder of the innermost core. However, in certain embodiments, the absolute refractive index difference (i.e., at the wavelength) between each up-doped/down-doped region and the remainder of the innermost core is at most about 0.2, at most about 0.1, or at most about 0.05. Such materials can be made from glasses similar to those of the remainder of the remainder of the innermost core, and thus can desirably have thermomechanical properties similar to those of the remainder of the innermost core, simplifying manufacture. In certain desirable embodiments, the substantially up-doped and/or down-doped regions are formed as regions of index discontinuity within the innermost core (i.e., with the change in refractive index occurring within about 1 μm in linear distance along the cross-section of the innermost core).

In certain particular embodiments, the innermost core of the mode mixing optical fiber includes a single annular shaped down-doped region, e.g., in the shape of a circular ring. The annular shaped down-doped region can, for example, have an inner diameter in the range of 5 microns to 20 microns, and an annular thickness in the range of 0.5 microns to 3 microns. The refractive index of the down-doped region can be such that the relative numerical aperture value with respect to the remainder of the innermost core is, for example, in the range of 0.01 to 0.15, e.g., 0.01 to 0.10, 0.01 to 0.05, 0.02 to 0.10, or 0.02 to 0.05. As used herein, the "diameter" of a non-circular feature is twice the radially-averaged distance from the geometrical center of the feature.

The mode mixing optical fiber can be provided in a variety of lengths. The person of ordinary skill in the art can select a length sufficient to provide the desired distribution of radiation into higher order modes. For example, in certain embodiments, the mode mixing optical fiber has a length in the range of about 1 m to about 100 m, e.g., in the range of about 1 m to about 50 m, or about 1 m to about 40 m, or about 1 m to about 50 m, or about 1 m to about 20 m, or about 1 m to about 10 m, or about 1 m to about 5 m, or about 5 m to about 100 m, or about 5 m to about 100 m, e.g., in the range of about 5 m to about 50 m, or about 5 m to about 40 m, or about 5 m to about 50 m, or about 5 m to about 20 m, or about 10 m to about 100 m, or about 10 m to about 50 m, or about 10 m to about 40 m.

In certain embodiments (including the embodiments of FIGS. 3, 4 and 6-8 as described above), the mode mixing optical fiber does not have a circularly-symmetric cross-sectional profile. In certain such embodiments, the cross-sectional profile of the mode mixing optical fiber is formed as a helix along the length hereof. That is, in a state that is not twisted by some external force, the various elements of the optical fiber twist in a helical configuration along the length of the fiber, for example, with a pitch in the range of about 1 mm to about 100 cm, e.g., in the range of about 1 mm to about 50 cm, or about 1 mm to about 30 cm, or about 1 mm to about 20 cm, or about 1 mm to about 10 cm, or about 1 mm to about 5 cm, or about 2 mm to about 100 cm, or about 2 mm to about 50 cm, or about 2 mm to about 30 cm, or about 2 mm to about 20 cm, or about 2 mm to about 10 cm, or about 2 mm to about 5 cm, or about 5 mm to about 100 cm, or about 5 mm to about 50 cm, or about 5 mm to about 30 cm, or about 5 mm to about 20 cm, or about 5 mm to about 10 cm, or about 5 mm to about 5 cm, or about 1 cm to about 100 cm, or about 1 cm to about 50 cm, or about 1 cm to about 30 cm, or about 1 cm to about 20 cm, or about 1 cm to about 10 cm, or about 1 cm to about 5 cm. Such a configuration is shown in schematic view in FIG. 9. A section of optical fiber 900 having an off-center innermost core is shown in side view, with the centerline 914 of the innermost core shown as a dashed line. The cross-sectional profile at each of positions A, B and C is shown. Notably, the off-center innermost core is formed as a helix throughout the fiber. The efficiency of the mode mixing process can be significantly increased by use of such a helical configuration. Such a fiber may be made using conventional methodologies (e.g., by spinning the preform during the draw of the optical fiber).

The mode mixing optical fiber can be made from conventional material using conventional methods in the art. For example, the optical fiber can be made using various silica-based glasses (e.g., germanosilicates, borosilicates, aluminosilicates, fluorosilicates and combinations thereof). In certain embodiments, the innermost core (e.g., exclusive of any up-doped or down-doped regions) is formed from substantially undoped silica, while the cladding (at least in the region immediately surrounding the innermost core) includes fluorine-doped silica. In other embodiments, the innermost core (e.g., exclusive of any down-doped regions) is formed from germanium-doped silica, while the cladding (at least in the region immediately surrounding the innermost core) includes substantially undoped silica. Conventional dopants can be used to provide up-doped and down-doped regions. Conventional methods of making optical fibers (e.g., stacking together various rods and tubes of different refractive indices, followed by collapsing them to a preform and drawing the preform) can be used to make the mode mixing optical fibers described herein.

Based on the present disclosure, the person of ordinary skill in the art can provide mode mixing optical fibers providing a wide variety of beam parameter products, and thus a wide variety of divergence angles. For example, in certain embodiments, the beam divergence of the mode mixing optical is in the range of about 40 mrad, 60 mrad or 80 mrad up to the numerical aperture of the optical fiber, e.g., in the range of about 40 mrad to about 600 mrad, or about 40 mrad to about 300 mrad, or about 40 mrad to about 160 mrad, or about 40 mrad to about 140 mrad, or about 40 mrad to about 120 mrad, or about 40 mrad to about 100 mrad, or about 40 mrad to about 80 mrad, or about 60 mrad to about 600 mrad, or about 60 mrad to about 300 mrad, or about 60 mrad to about 160 mrad, or about 60 mrad to about 140 mrad, or about 60 mrad to about 120 mrad, or about 60 mrad to about 100 mrad, or about 80 mrad to about 600 mrad, or about 80 mrad to about 300 mrad, or about 80 mrad to about 160 mrad, or about 80 mrad to about 140 mrad, or about 80 mrad to about 120 mrad, or about 80 mrad to about 100 mrad, or about 100 mrad to about 200 mrad, or about 100 mrad to about 400 mrad, or about 100 mrad to about 600 mrad, or about 200 mrad to about 600 mrad. Of course, the person of ordinary skill in the art can provide mode mixing optical fibers having different divergence angles for different applications. For example, the person of ordinary skill in the art, in some embodiments, can provide mode mixing optical fibers with a beam divergence angles as high as the NA of the innermost core.

Similarly, based on the present disclosure, the person of ordinary skill in the art can provide mode mixing optical fibers providing a substantially flat-top output. For example, the mode mixing optical fiber can be configured to guide or output a beam (i.e., as defined by an outer periphery at 5% of the peak intensity) having at least 70%, at least 80%, or even at least 90% of its cross-sectional area within about 20%, within about 15%, or even within about 10% of its average intensity. For example, the mode mixing fiber can be configured to guide or output radiation (i.e., as defined by an outer periphery at 5% of the peak intensity) having at least 70%, at least 80%, or even at least 90% of its cross-sectional area within about 20%, within about 15%, or even within about 10% of its average intensity, e.g., when the radiation input to the mode mixing fiber has no more than 50%, no more than 40%, no more than 30% or even no more than 20% of its cross-sectional area within about 20%, within about 15%, or even within about 10% of its average intensity (e.g., with its highest intensity at the center).

The mode mixing optical fibers can be provided with a variety of numerical aperture values. For example, in certain embodiments, the numerical aperture of a mode mixing optical fiber is in the range of about 0.10 to about 0.60, e.g., in the range of about 0.10 to about 0.40 or about 0.10 to about 0.30, or about 0.10 to about 0.22, or about 0.15 to about 0.60, or about 0.15 to about 0.40, or about 0.15 to about 0.30.

The various regions of the refractive index profile of the innermost core can perturb the propagation of radiation therein, e.g., by acting as a scattering (or weakly guiding) center, reflecting (or guiding) the light away and populating the higher order modes of the innermost core. As the person of ordinary skill in the art will appreciate based on the present disclosure, the performance of the mode mixing optical fibers described herein may be influenced by several design parameters including, for example, the lateral offset of the innermost core, the refractive index profile of the innermost core, the numerical aperture, the length of the mode mixing fiber, any coiling conditions (diameter and length), and any helicity of the refractive index profile of the innermost core. The design of the mode mixing optical fiber may be scaled in order to provide a desired innermost core size (e.g., to match the size of a separate beam delivery fiber when one is used.

Figure 10:
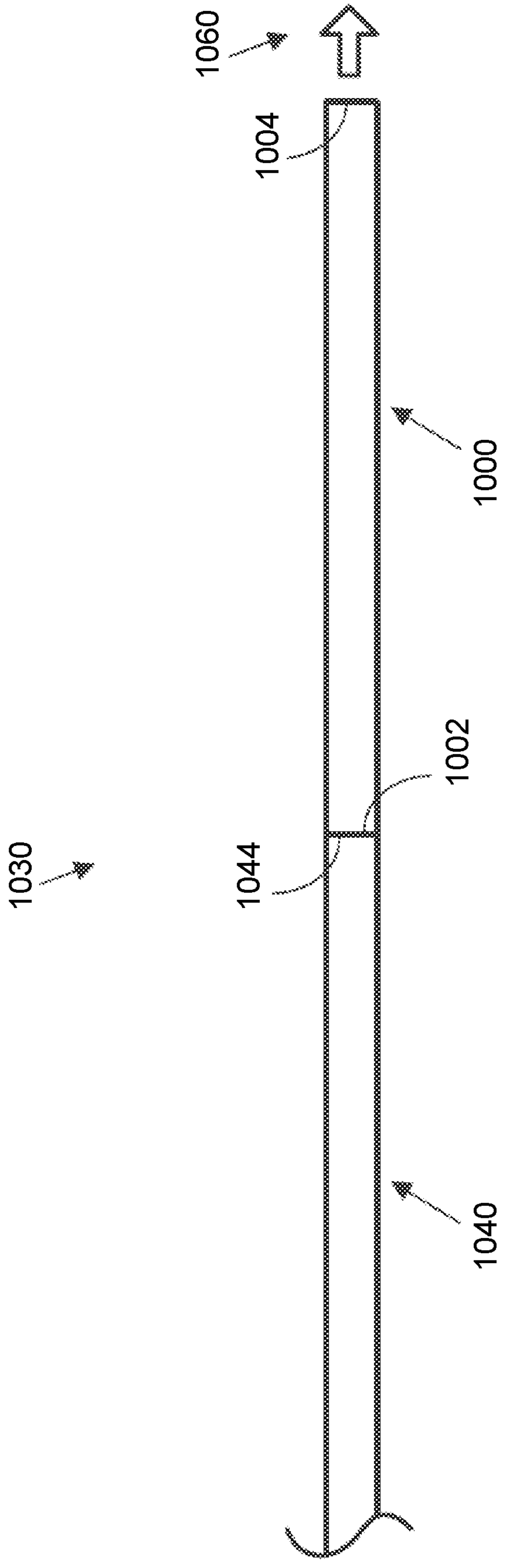
FIG. 10 is a schematic view of an optical system according to one embodiment of the disclosure.

Another aspect of the disclosure is an optical system that includes a mode mixing optical fiber as described above, and a first optical fiber having an output end directly optically coupled to the input end of the mode mixing optical fiber, the first optical fiber being configured to propagate optical radiation having the wavelength. One such embodiment is shown in schematic side view in FIG. 10. Optical system 1030 includes a mode mixing optical fiber 1000, having an input end 1002 and an output end 1004, as well as a first optical fiber 1040, having an output end 1044. The output end 1044 of the first optical fiber is directly optically coupled to the input end 1002 of the mode mixing optical fiber (i.e., without any substantial optical component therebetween). For example, the output end of the first optical fiber can be fusion spliced to the input end of the mode mixing optical fiber. The first optical fiber can couple light radiation to the input end of the mode mixing optical fiber such that their centerlines are aligned with one another (i.e., even though the innermost core of the mode mixing optical fiber may be offset from the centerline of the mode mixing optical fiber).

Notably, the mode mixing optical fiber can accept radiation from a single or few-moded optical fiber and, through distribution of radiation into higher order modes, provide an output beam having desired optical characteristics (e.g., as described above). Thus, in certain embodiments, the first optical fiber is single-mode at the wavelength. In other embodiments, the first optical fiber has 7 or fewer, 6 or fewer, 5 or fewer or even 4 or fewer modes at the wavelength. Of course, in other embodiments, the mode mixing fiber can accept radiation from a multimode optical fiber, or from a solid state source (e.g., via coupling through free-space optics).

In certain advantageous embodiments, the first optical fiber is configured to provide radiation from an optical fiber laser or optical fiber amplifier. For example, the first optical fiber can be an active optical fiber of a fiber laser or a fiber amplifier, e.g., a rare-earth doped fiber, or a fiber configured to provide gain through some non-linear process (e.g., Raman scattering, Brillouin scattering).

In certain embodiments, the first optical fiber has substantially the same diameter as the mode mixing optical fiber. Such embodiments may be especially advantaged, in that the alignment of the first optical fiber to the mode mixing optical fiber (i.e., for optical coupling, for example, via fusion splicing) can be simplified. Similarly, in certain embodiments, the diameter of the innermost core of the first optical fiber is within 10%, or even within 5% of the diameter of the innermost core of the mode mixing optical fiber.

In certain embodiments, the mode mixing optical fiber can provide a beam having desirable optical characteristics from its second end. For example, in certain embodiments, the optical system is configured to launch a free space-propagating beam (e.g., as identified by reference numeral 1060 in FIG. 10) from the second end of the mode mixing optical fiber. In such embodiments, the mode mixing optical fiber can act as a beam delivery fiber, and can be configured in a beam delivery cable, e.g., ruggedized to allow for handling in an industrial environment. If necessary, additional optics (e.g., collimating lenses and/or other diffractive or refractive elements) can be provided at the output end of the mode mixing optical fiber.

In other embodiments, the optical system further includes a second optical fiber, the second optical fiber being a multi-mode at the wavelength, the second optical fiber having an input end and an output end, the input end of the second optical fiber being directly optically coupled to the output end of the mode mixing optical fiber. One particular embodiment is shown in schematic view in FIG. 11. Optical system 1130 includes a first optical fiber 1140 and a mode mixing optical fiber 1100 with the output 1144 of the first optical fiber directly optically coupled to the input 1102 of the mode mixing optical fiber as described above. Optical system 1100 further includes a second optical fiber 1150, having an input end 1152 and an output end 1154, with the input end 1152 of the second optical fiber directly optically coupled (here, fusion spliced) to the output end 1104 of the mode mixing optical fiber. In such embodiments, the mode mixing optical fiber can act to transform the optical characteristics of the output of the first optical fiber (e.g., intensity profile) to a more desirable state (e.g., having a flat-top intensity profile) to be coupled into the second optical fiber.

The system can be configured to launch a free space-propagating beam (e.g., as identified by reference numeral 1160 in FIG. 11) from the second end of the second optical fiber. In such embodiments, the second optical fiber can act as a beam delivery fiber, and can be configured in a beam delivery cable, e.g., ruggedized to allow for handling in an industrial environment. If necessary, additional optics (e.g., collimating lenses and/or other diffractive or refractive elements) can be provided at the output end of the second optical fiber.

Figure 12:
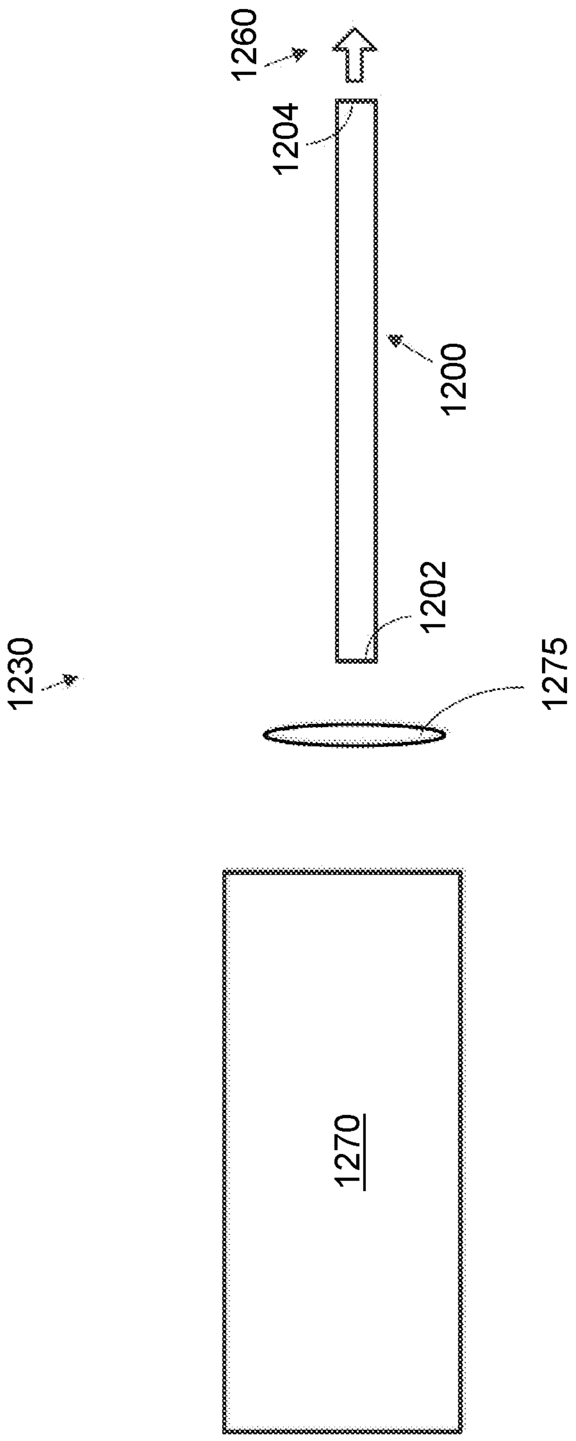
FIG. 12 is a schematic view of an optical system according to another embodiment of the disclosure.

In other embodiments, an optical system includes a mode mixing optical fiber having its input end coupled to the output of an optical source, such as a solid state laser. The optical source can be coupled to the input end of the mode mixing fiber, for example, using free-space optics. An example of such an embodiment is shown in FIG. 12. Optical fiber system 1230 includes an optical source 1270 (e.g., a solid-state laser) having its output coupled to the input end 1202 of mode mixing optical fiber 1200 through free-space optics 1275 (e.g., one or more lenses). A free space-propagating beam (e.g., as identified by reference numeral 1260 in FIG. 12) can be emitted from the second end 1200 of the mode mixing optical fiber.

The diameter of the innermost core of the second optical fiber can vary depending on the end-user needs, for example, to allow for implementation in already existing systems. The diameter of the innermost core of the second optical fiber can be, for example, within about 10%, or even within about 5% of the diameter of the innermost core of the mode mixing optical fiber. Of course, in other embodiments, the innermost core of the second optical fiber can be a different size, e.g., in the range of about 50 μm to about 3000 or about 50 μm to about 2000 or about 50 μm to about 1000 or about 50 μm to about 600 or about 100 μm to about 3000 or about 100 μm to about 2000 or about 100 μm to about 1000 or about 100 μm to about 600 or about 200 μm to about 3000 or about 200 μm to about 2000 or about 200 μm to about 1000 or about 200 μm to about 600 μm.

The systems described herein can be configured to output a beam (i.e., as defined by an outer periphery at 5% of the peak intensity) having at least 70%, at least 80%, or even at least 90% of its cross-sectional area within about 20%, within about 15%, or even within about 10% of its average intensity, e.g., when the radiation input to the mode mixing fiber has no more than 50%, no more than 40%, no more than 30% or even no more than 20% of its cross-sectional area within about 20%, within about 15%, or even within about 10% of its average intensity (e.g., with its highest intensity at the center).

Another aspect of the disclosure is a method for providing guided radiation of the wavelength having a desired intensity profile. The method includes coupling input radiation into a first end of a mode mixing fiber as described herein, and guiding the radiation along the mode mixing optical fiber to provide guided radiation having a desired intensity profile, e.g., a flat-top intensity profile as described herein. In certain embodiments, the guided radiation (i.e., as defined by an outer periphery at 5% of the peak intensity) having the desired intensity profile has at least 70%, at least 80%, or even at least 90% of its cross-sectional area within about 20%, within about 15%, or even within about 10% of its average intensity. The radiation can be guided along a length of the mode mixing optical fiber of, for example, in the range of about 1 m to about 100 m, e.g., in the range of about 1 m to about 50 m, or about 1 m to about 40 m, or about 1 m to about 50 m, or about 1 m to about 20 m, or about 1 m to about 10 m, or about 1 m to about 5 m, or about 5 m to about 100 m, or about 5 m to about 100 m, e.g., in the range of about 5 m to about 50 m, or about 5 m to about 40 m, or about 5 m to about 50 m, or about 5 m to about 20 m, or about 10 m to about 100 m, or about 10 m to about 50 m, or about 10 m to about 40 m to provide the radiation having the desired intensity profile. In certain embodiments, the input radiation has a substantially different intensity profile than the desired intensity profile. For example, in certain embodiments, the input radiation has no more than 50%, no more than 40%, no more than 30% or even no more than 20% of its cross-sectional area within about 20%, within about 15%, or even within about 10% of its average intensity (e.g., with its highest intensity at the center). The method can be used in conjunction with any of the mode mixing fibers or systems as described herein.

Another aspect of the disclosure is a method for providing a free space-propagating optical beam using an optical system as described herein. The method includes propagating radiation of the wavelength from the first optical fiber into the mode mixing optical fiber; and propagating the radiation from the output end of the mode mixing optical fiber. If the system includes a second optical fiber as described above, the method can further include propagating the radiation through the second optical fiber and from its output end. The method can be performed such that the divergence, BPP and/or flatness is as described in any embodiment above. For example, in certain embodiments, the beam (i.e., as defined by an outer periphery at 5% of the peak intensity) having the desired intensity profile has at least 70%, at least 80%, or even at least 90% of its cross-sectional area within about 20%, within about 15%, or even within about 10% of its average intensity. In certain embodiments, the input radiation has a substantially different intensity profile than the desired intensity profile. For example, in certain embodiments, the input radiation has no more than 50%, no more than 40%, no more than 30% or even no more than 20% of its cross-sectional area within about 20%, within about 15%, or even within about 10% of its average intensity (e.g., with its highest intensity at the center).

Various aspects and embodiments of the disclosure will be further explained with reference to the following non-limiting Examples:

EXAMPLES

The mode mixing effect of certain mode mixing optical fibers described herein was demonstrated both numerically and experimentally.

Example 1

Figure 11:
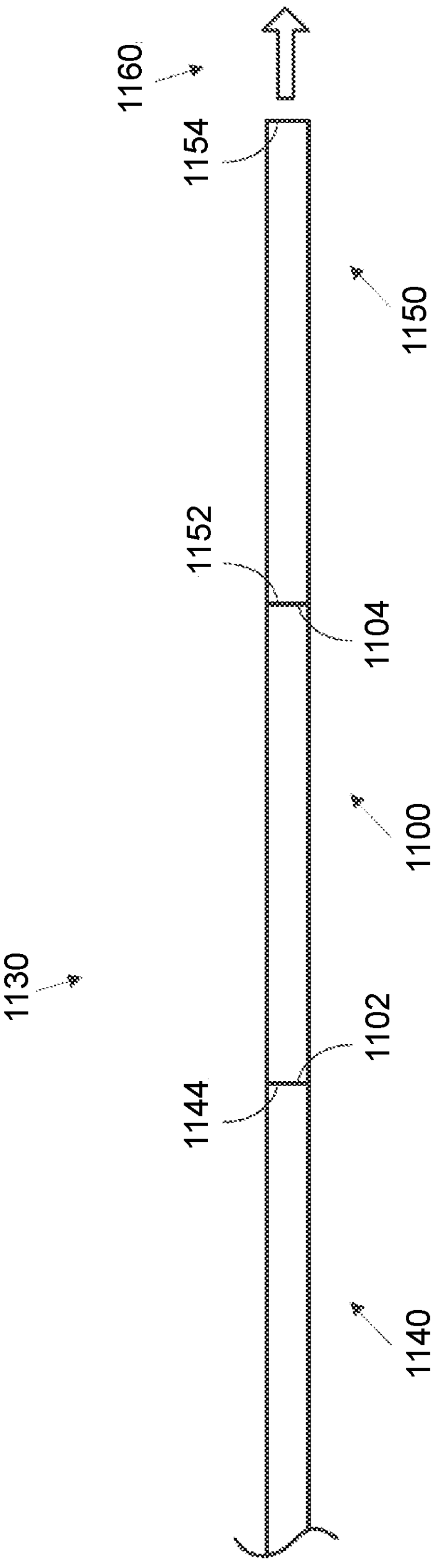
FIG. 11 is a schematic view of an optical system according to another embodiment of the disclosure.

In Example 1, the overall test configuration was as shown in FIG. 11, with the mode mixing fiber configured to transform radiation output from a large mode area single mode fiber to a beam delivery cable.

Figure 13:
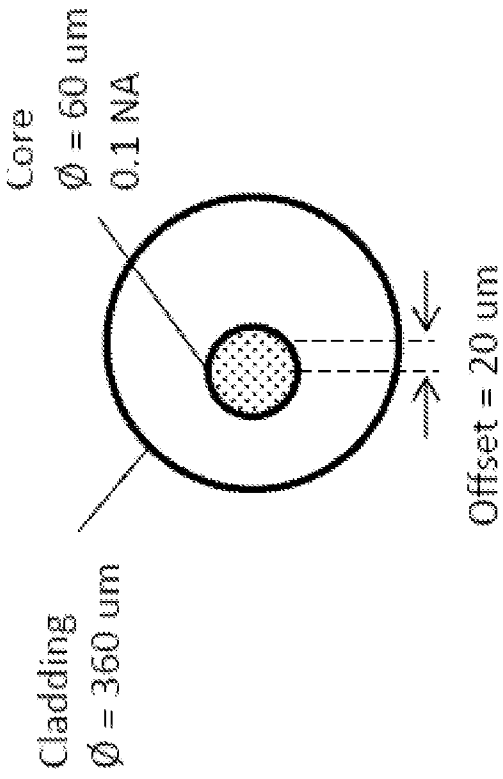
FIG. 13 is a schematic cross-sectional view of the mode mixing optical fiber used in the experiments of Example 1.
Figure 14:
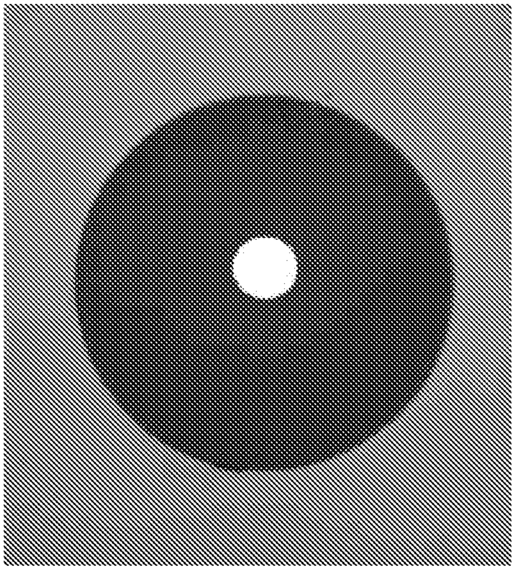
FIG. 14 is a picture of a cleaved fiber endface of the mode mixing optical fiber used in the experiments of Example 1.

The mode mixing optical fiber is shown in schematic view in FIG. 13, with the cleaved fiber endface shown in the photograph of FIG. 14. The mode mixing optical fiber has a germanium-coped core 60 μm in diameter, with a step index profile. The core has a numerical aperture of 0.11, and is laterally offset with respect to the centerline of the overall optical fiber by 20 μm. The overall fiber diameter is 360 μm.

The first optical fiber is a conventional large mode area single mode fiber having a 20 μm diameter core, numerical aperture of 0.06, and overall diameter of 400 μm. The second optical fiber (i.e., of the beam delivery cable) is matched to certain commercially available devices, and has a 100 μm diameter core, a numerical aperture of 0.22, an overall fiber diameter of 360 μm and a length of 25 m.

Figure 15:
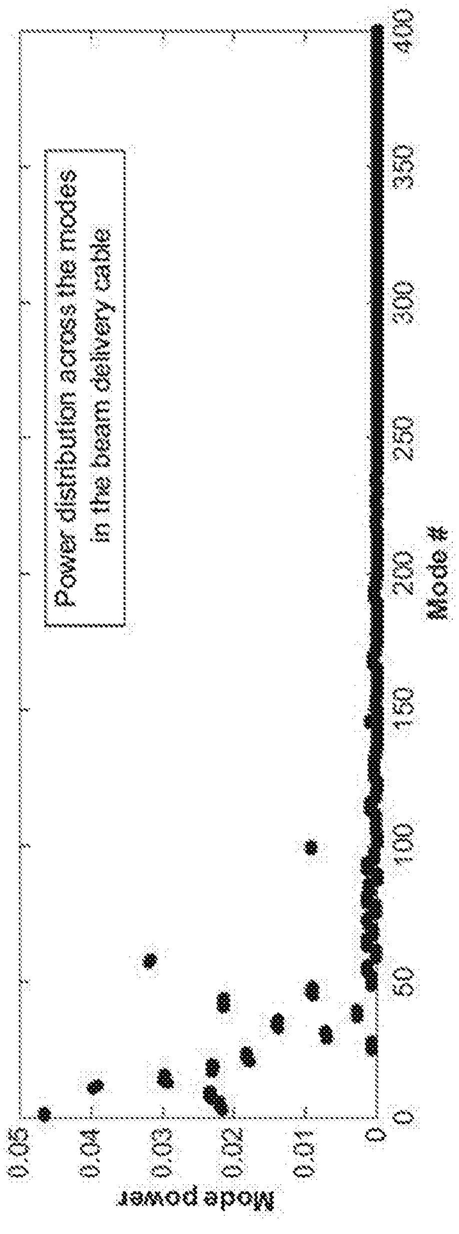
FIG. 15 is a graph showing the calculated power distribution among modes excited in the mode mixing beam delivery cable in the experiments of Example 1.
Figure 17:
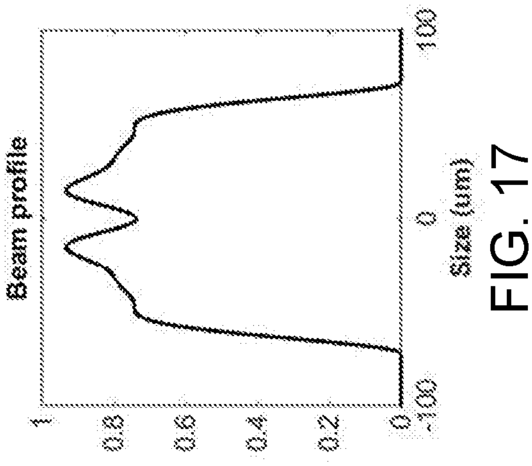
FIG. 17 is a plot of the calculated profile of the beam delivered by the mode mixing beam delivery cable in the experiments of Example 1.
Figure 16:
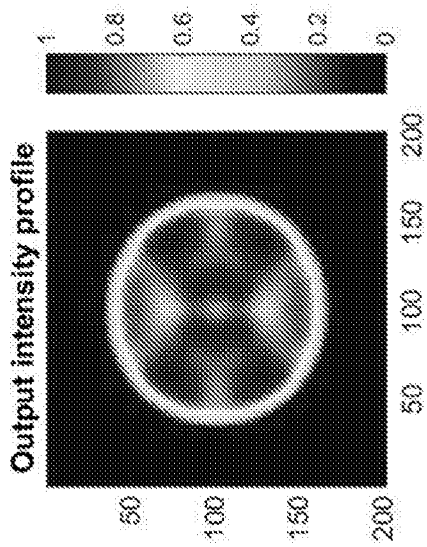
FIG. 16 is a 2D plot of the calculated total output intensity delivered by the mode mixing beam delivery cable in the experiments of Example 1.

The results of calculations are shown in FIGS. 15-17. The power distribution among the modes excited in the beam delivery cable is shown in FIG. 15. The total output intensity delivered by the beam delivery cable is shown in FIG. 16, and the corresponding beam profile is shown in FIG. 17. The output beam is flat-top shaped and the BPP is estimated to be about 3.4 mm·mrad.

Figure 18:
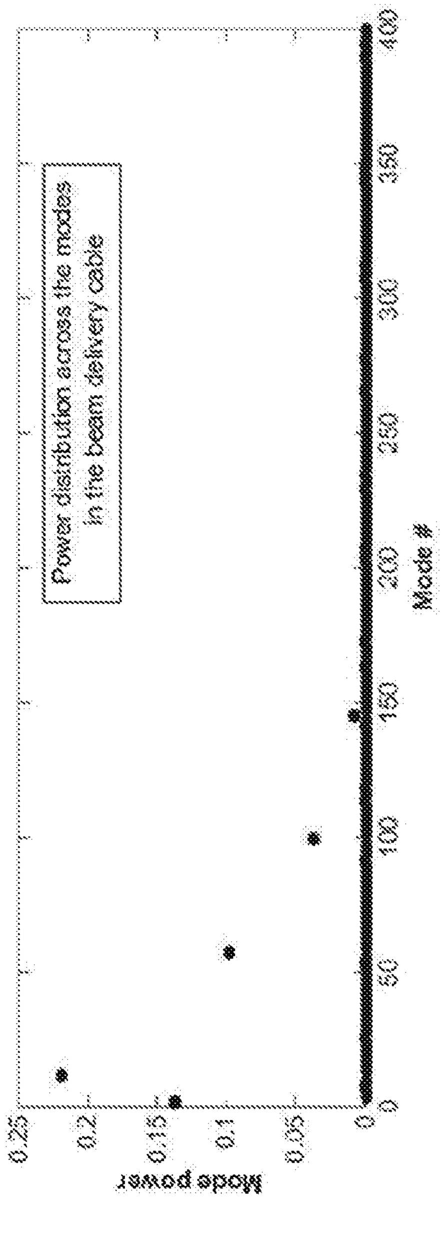
FIG. 18 is a graph showing the calculated power distribution among modes excited in a conventional beam delivery cable in the experiments of Example 1.
Figure 19:
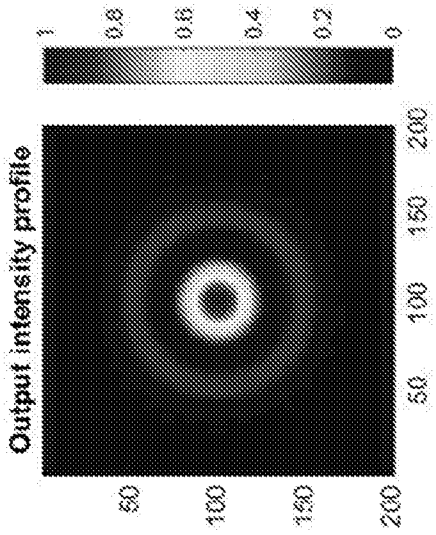
FIG. 19 is a 2D plot of the calculated total output intensity delivered by a conventional beam delivery cable in the experiments of Example 1.
Figure 20:
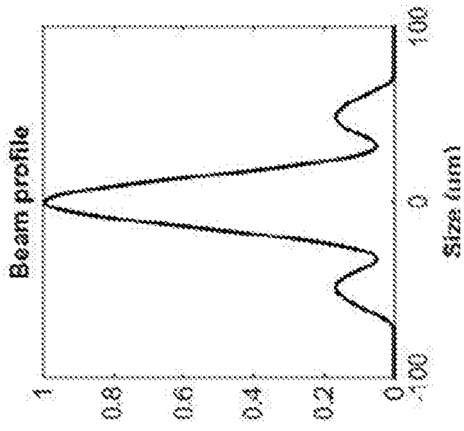
FIG. 20 is a plot of the calculated profile of the beam delivered by a conventional beam delivery cable in the experiments of Example 1.
Figure 21:
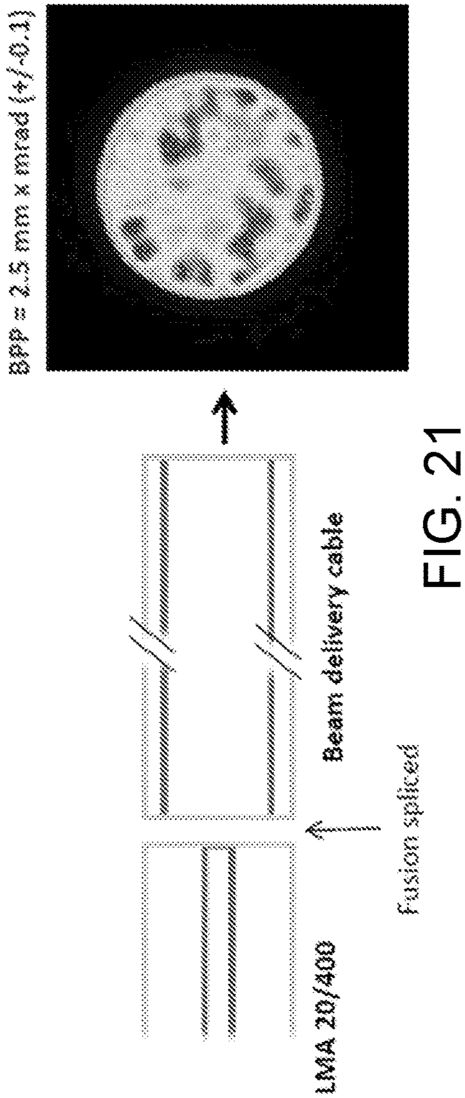
FIG. 21 is a schematic view of a conventional system and a 2D graph of the total output intensity delivered thereby as described in the experiments of Example 1.
Figure 22:
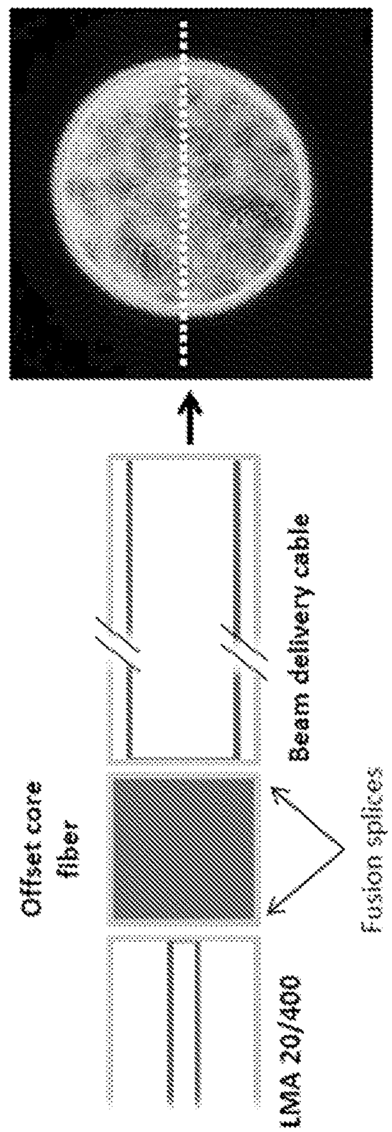
FIG. 22 is a schematic view of an optical system including an offset core mode mixing fiber and a 2D graph of the total output intensity delivered thereby as described in the experiments of Example 1.
Figure 22:
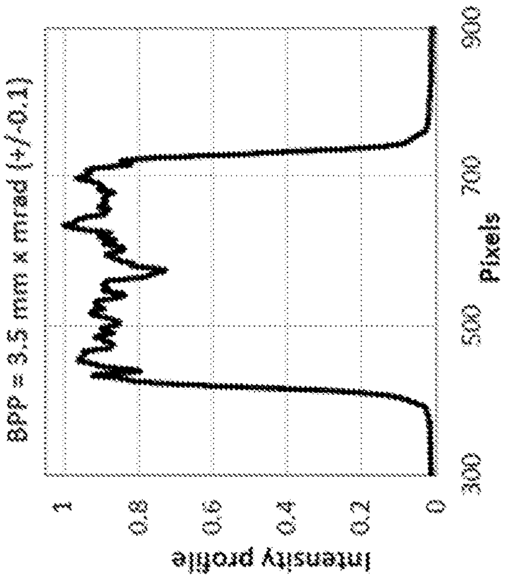

The mode mixing effect induced by the mode mixing fiber appears clearly when comparing these results to the case without a mode mixing fiber, shown in FIGS. 18-20. With the otherwise same parameters, the simulation performed without the mode mixing optical fiber provides a sharply-peaked output beam, Experimental results were also collected. In the case without the mode mixing optical fiber (as described with respect to FIGS. 18-20), the beam emerging the conventional beam delivery cable was characterized by recording the near-field intensity profile and the BPP. Results are shown in FIG. 21. Due to the low degree of mode-mixing, the beam profile is very uneven and the measured BPP of 2.5 mm·mrad out of the especially desired range of 3 to 4 mm·mrad. In contrast, when using the mode mixing optical fiber, as described above with respect to FIGS. 13-17, the near-field profile shows a good uniformity (FIG. 22) with BPP values around 3.5 mm·mrad.

Example 2

Figure 25:
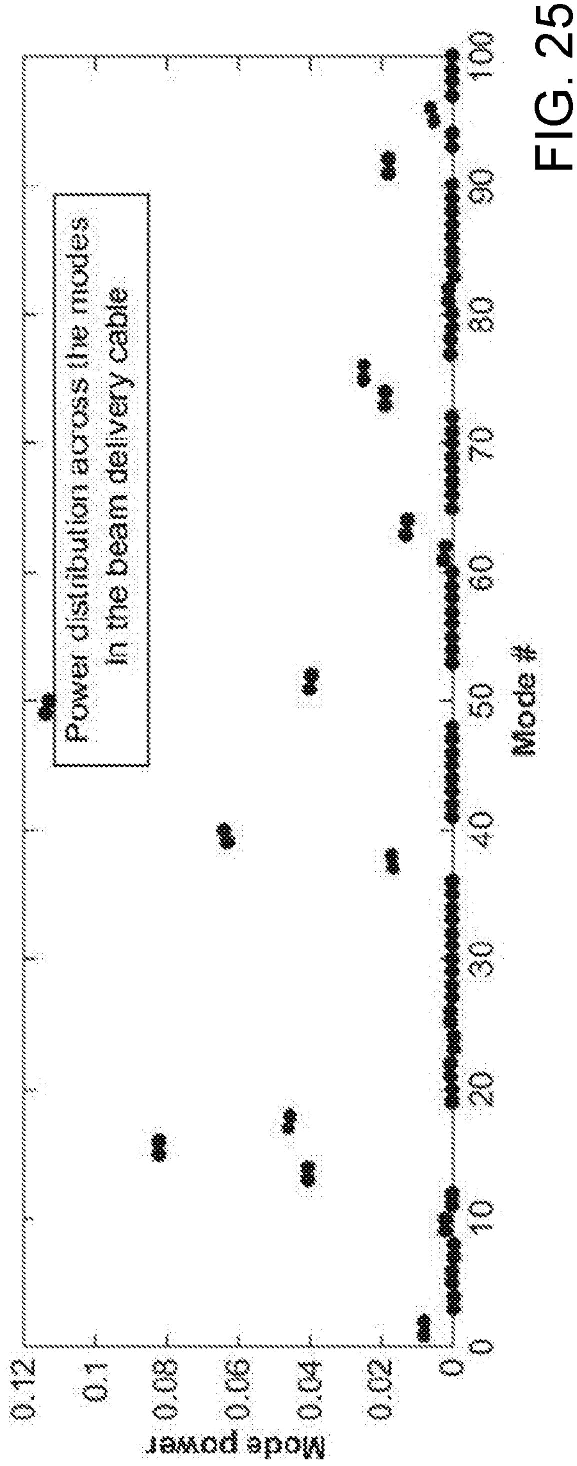
FIG. 25 is a graph showing the calculated power distribution among modes excited in the mode mixing beam delivery cable in the experiments of Example 2.
Figure 26:
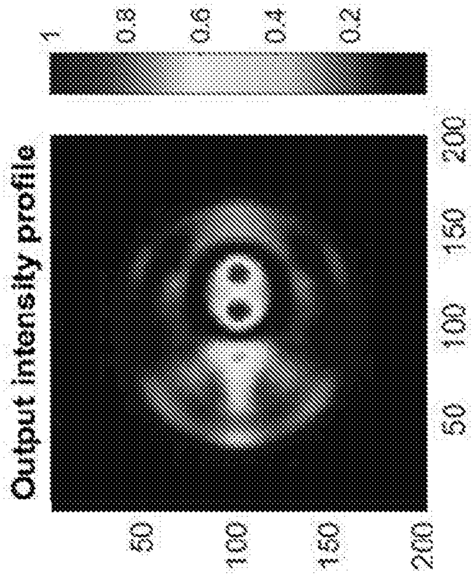
FIG. 26 is a 2D plot of the calculated total output intensity delivered by the mode mixing beam delivery cable in the experiments of Example 2.
Figure 27:
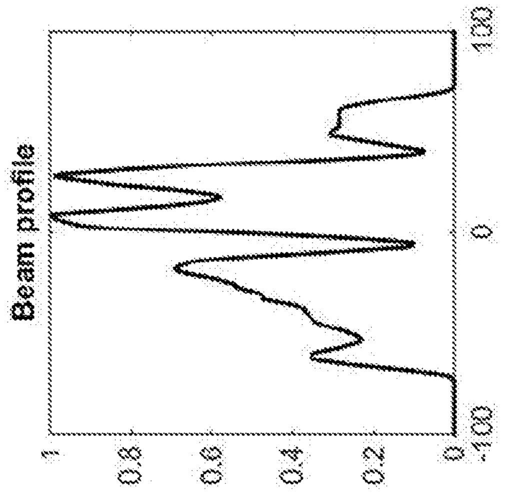
FIG. 27 is a plot of the calculated profile of the beam delivered by the mode mixing beam delivery cable in the experiments of Example 2.

In this example, the system was configured with the mode mixing optical fiber as a beam delivery fiber (e.g., as shown in FIG. 11). Here, too, both simulation and experimental results are presented. Here, the mode mixing optical fiber has a silica core 100 μm in diameter, surrounded by a down-doped fluorine cladding layer sufficient to provide a numerical aperture of 0.22, with a silica outer cladding to provide an overall fiber diameter of 360 μm. The core includes a low-index ring formed by fluorine-doped silica. The ring is 4 μm in annular thickness, having an inner diameter of 30 μm with its center laterally offset from the centerline of the optical fiber by 12 μm. The index contrast between the ring and the remainder of the innermost core is sufficient to provide a numerical aperture value of 0.1 (i.e., between the material of the ring and that of the rest of the innermost core; the ring itself is not sufficient to guide light of the wavelength). The design is shown in schematic cross-sectional view in FIG. 23. The first optical fiber is a conventional large mode area single mode fiber as described above in Example 1. Calculation results are summarized in FIGS. 25-27, in which the power distribution among the modes excited in the mode mixing optical fiber is shown in FIG. 25; the total output intensity delivered by the second end of the mode mixing optical fiber is shown in FIG. 26; and the corresponding beam profile is shown in FIG. 27.

As noted above, in this Example, the mode mixing fiber is configured as a beam delivery cable. The mode up-conversion is demonstrated on the plot showing the power distribution in FIG. 25 (only the first 100 modes were plotted for clarity purposes). With these exact parameters, the BPP was estimated around 4 mm·mrad. However, the output beam is not calculated to be exactly flat-top shaped (although it is remarkably flat as compared to a Gaussian beam). This can be changed by the person of ordinary skill in the art by modifying appropriately the design of the fiber, the size and location of the core elements.

Figure 23:
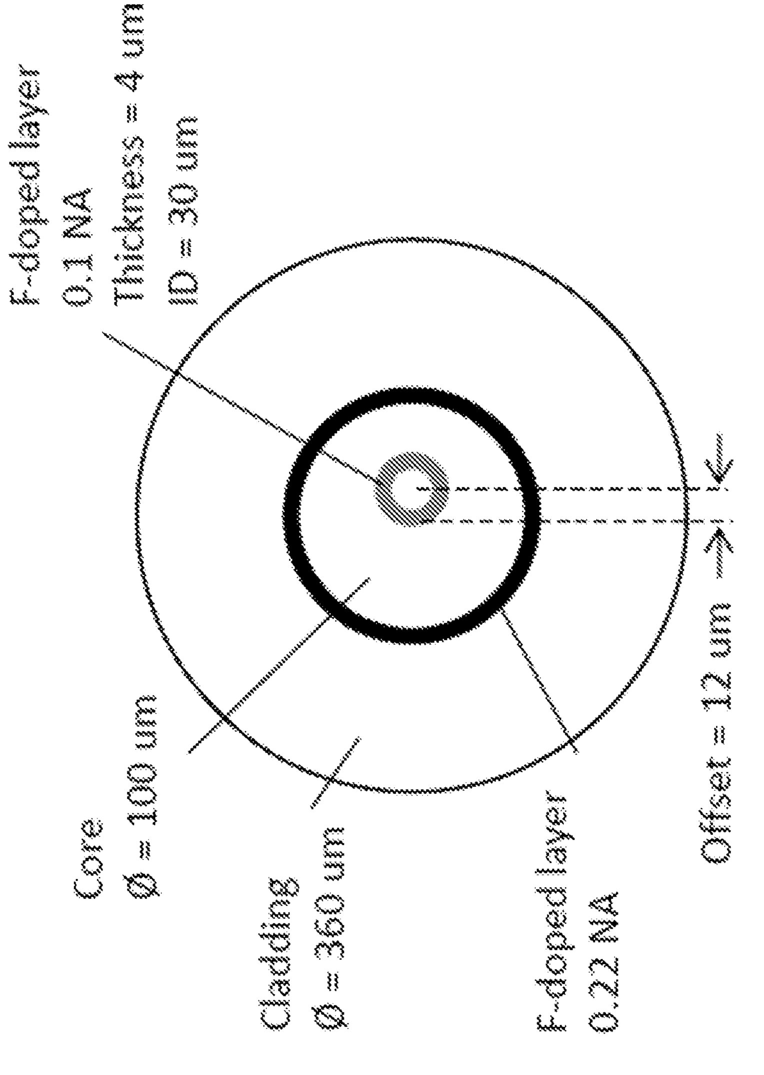
FIG. 23 is a cross-sectional schematic view of the design of the mode-mixing optical fiber used in the experiments of Example 2.
Figure 24:
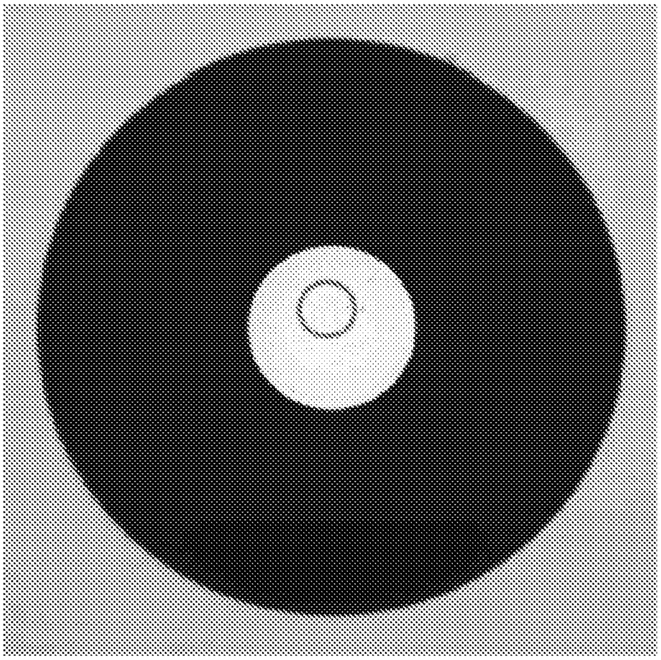
FIG. 24 is an index-contrast image of a cleaved endface of the fiber of FIG. 22.
Figure 28:
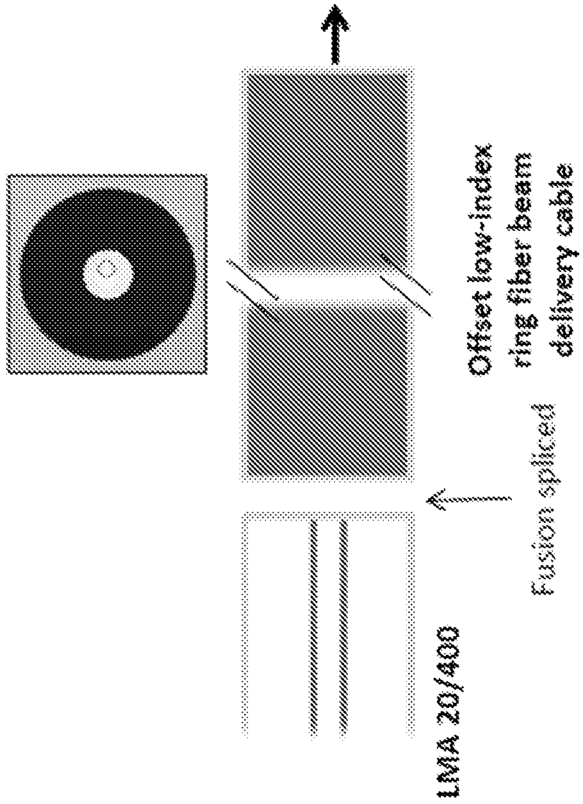
FIG. 28 is a schematic view of an optical system including an offset low-index ring mode mixing fiber used in the experiments of Example 2.
Figure 29:
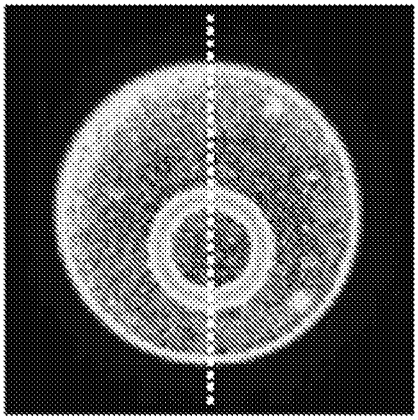
FIG. 29 is a 2D graph of the total output intensity delivered by the system of FIG. 27 as described in the experiments of Example 2.
Figure 30:
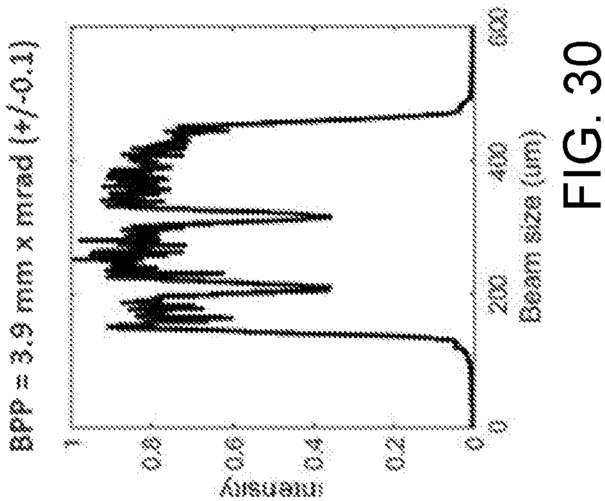
FIG. 30 is an intensity profile of the output delivered by the system of FIG. 27 as described in the experiments of Example 2.

An experimental demonstration of the mode mixing created by the up-conversion beam delivery cable using the mode mixing fiber of FIGS. 23 and 24 is shown in FIGS. 28-30. The measurement setup is shown in schematic view in FIG. 28. The measured intensity and beam profile displayed respectively in FIGS. 29 and 30 demonstrate good uniformity with a BPP measured at 3.9 mm·mrad, demonstrating the mode up-conversion occurring in this fiber used as beam delivery cable. This can be compared to the results shown in FIG. 21, which resulted from the use of a conventional beam delivery cable. Here, the low-index ring does appear in the output intensity profile with a 50% intensity contrast compared to the maximum intensity. This ring contrast can be reduced by modifying appropriately the fiber design, as shown below with respect to Example 3.

Example 3

In this example, the system was configured substantially similarly to the configuration of Example 2, but with the numerical aperture value of the low-index ring in the core being 0.02 (i.e., instead of 0.1 as in Example 2).

Figure 32:
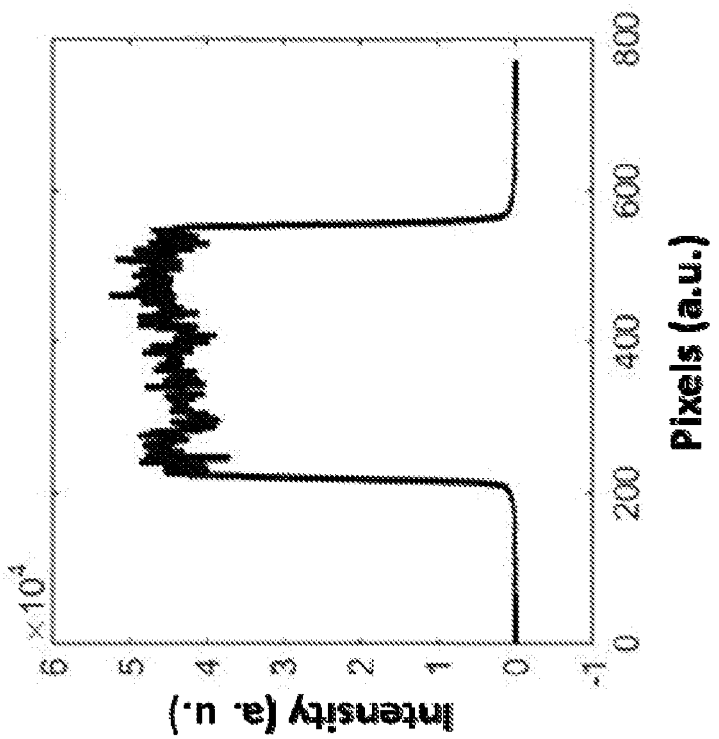
FIG. 32 is an intensity profile of the output delivered in the experiments of Example 3.
Figure 31:
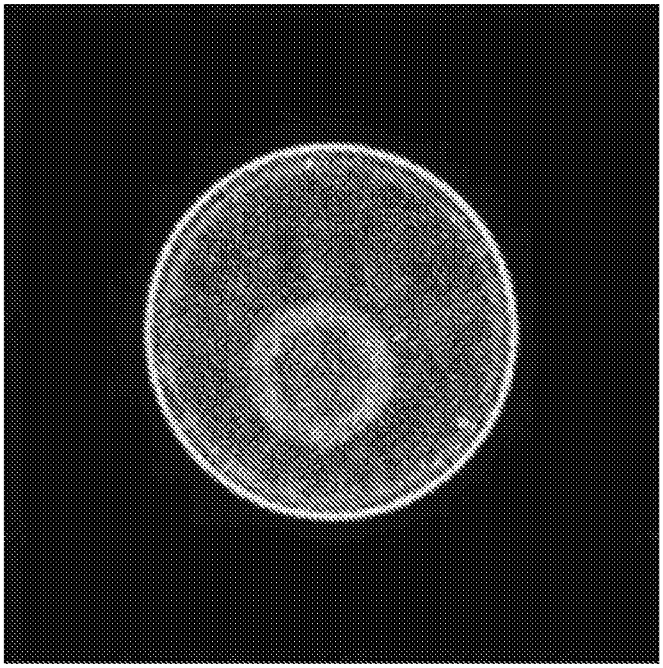
FIG. 31 is a 2D graph of the total output intensity delivered in the experiments of Example 3.

An experimental demonstration of the mode mixing created by the up-conversion beam delivery cable using the mode mixing fiber of this Example is shown in FIGS. 31 and 32. The measured intensity and beam profile displayed respectively in FIGS. 31 and 32 demonstrate good uniformity. This can be compared to the results Example 2, demonstrating that in fact appropriate design can maintain a desirably flat-top profile while reducing the intensity contrast caused by the down-doped ring.

Example 4

Figure 33:
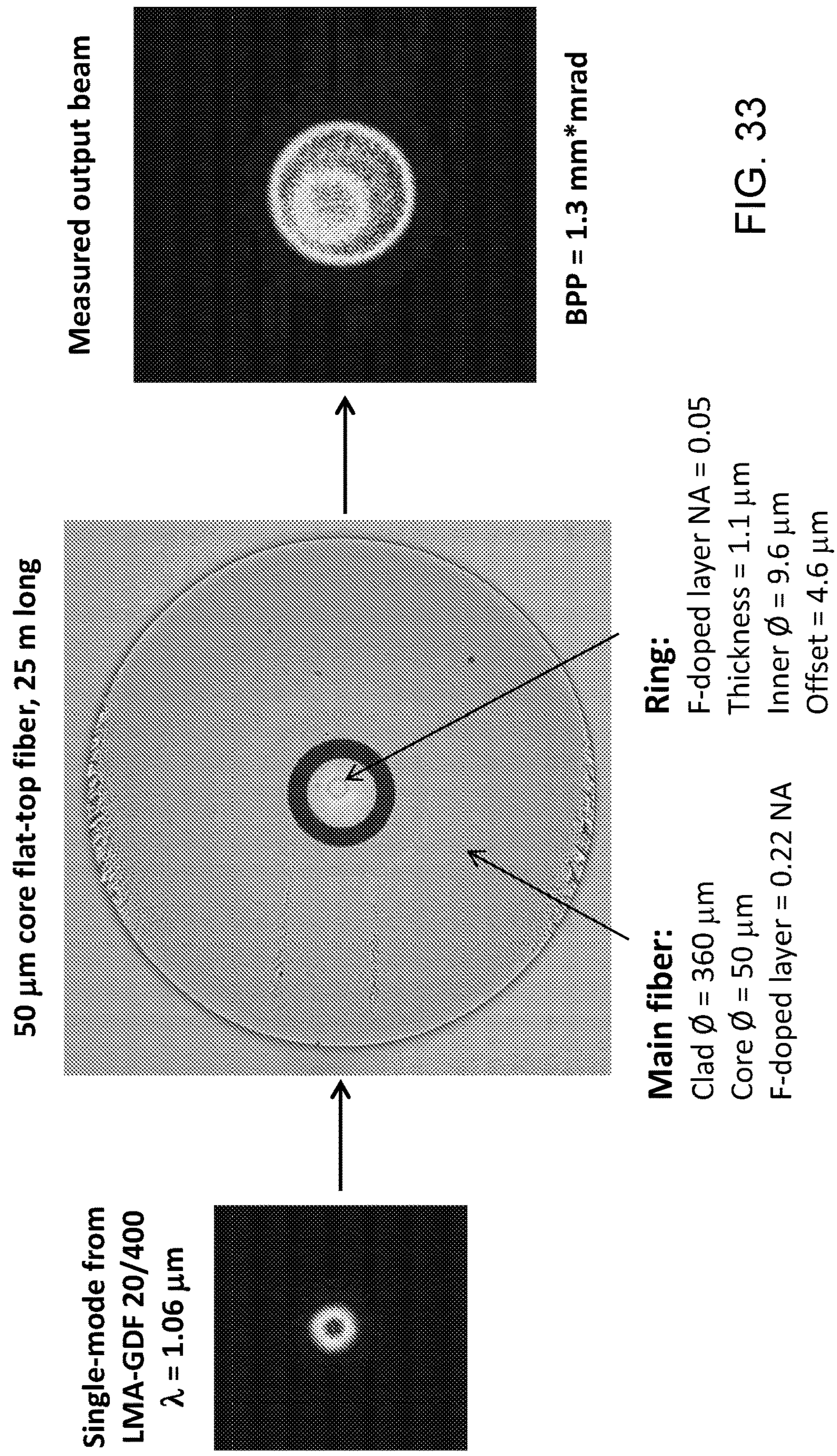
FIG. 33 is a set of images providing the results of a first experiment described in Example 4.
Figure 34:
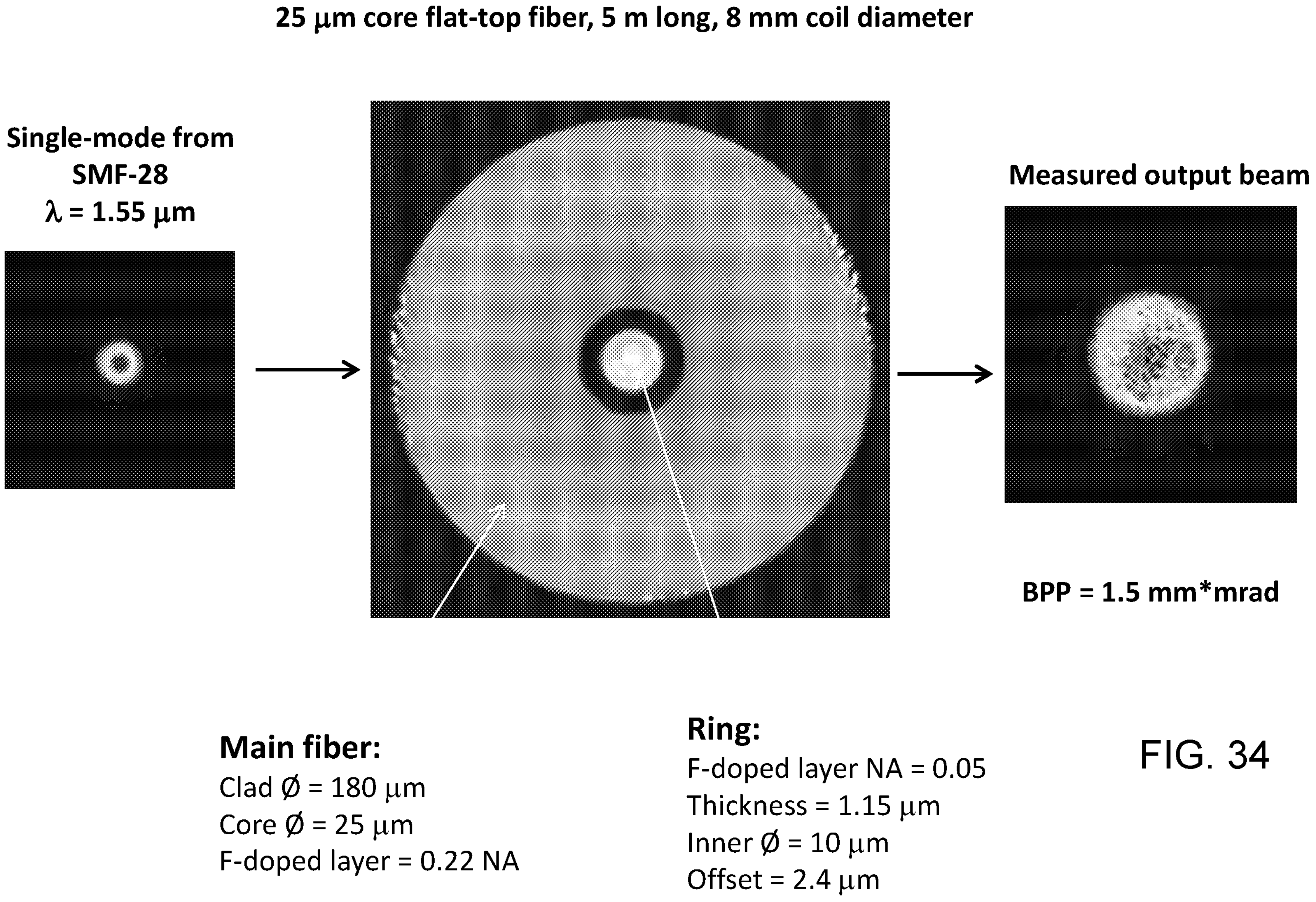
FIG. 34 is a set of images providing the results of a second experiment described in Example 4.

In this example, mode mixing optical fibers of different core diameters were used, one of 50 μm core and another of 25 μm core diameter, with single mode input radiation. A first experiment using a 50 μm core mode mixing fiber is described with respect to FIG. 33. Here, an LMA/GDF 20/400 fiber was spliced to the input end of a 25 m long mode mixing optical fiber having a down-doped ring disposed offset within the inner core; details are shown in FIG. 33. Single mode radiation at wavelength 1.06 μm was coupled from the LMA-GDF 20/400 fiber into the mode mixing optical fiber. The intensity was measured at cleaved endface at the output of the mode mixing optical fiber. As shown in FIG. 33, the output intensity was substantially uniform, but for some intensity contrast at the position of the ring-shaped down-doped element. The BPP was about 1.3 mm-mrad. In a second experiment, the mode mixing optical fiber was similar to that of the first experiment above, but with a 25 μm core diameter; dimensions are provided in FIG. 33. The mode mixing fiber was 5 m long and was coiled with an 8 mm coil diameter. Here, the input fiber was a single mode SMF-28 fiber, and the radiation was of wavelength 1.55 m. Single mode radiation was coupled from the LMA-GDF 20/400 fiber into the mode mixing optical fiber. Here, too, as shown in FIG. 34, the output intensity was substantially uniform. The BPP was about 1.5 mm-mrad.

Example 5

Figure 35:
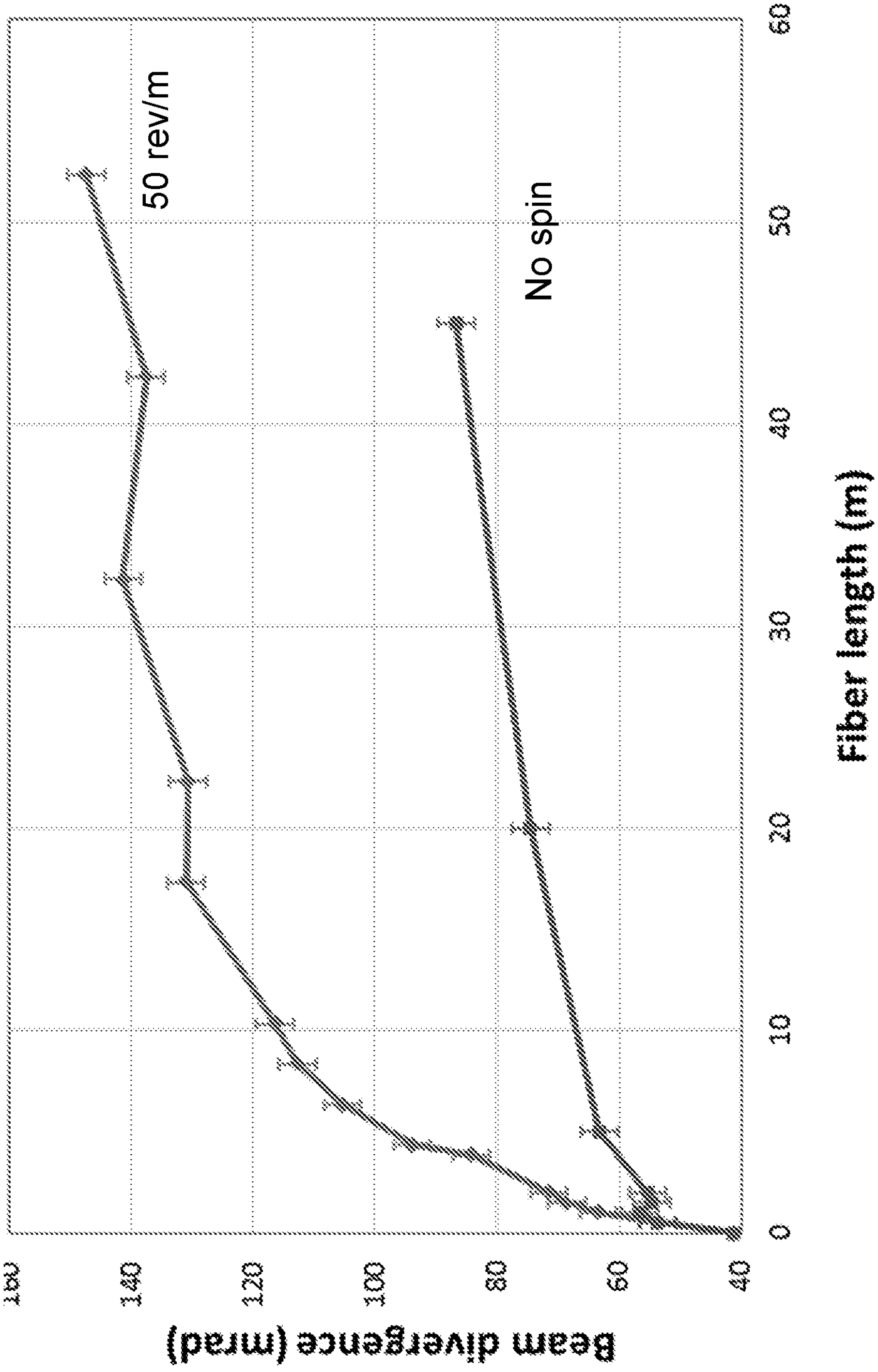
FIG. 35 is a plot of beam divergence vs. fiber length for the mode mixing fibers described in Example 5

This example demonstrates the desirable increase in beam divergence for a mode mixing optical fiber having a helical profile. Two mode mixing optical fibers were made, identical but for the fact that for the "spun" fiber, the preform was spun during drawing to provide a helical profile with a period of 50 revolutions/m. Beam divergence was measured as a function of fiber length using a cutback methodology. Results are shown in the graph of FIG. 35. Notably, beam divergence was substantially increased for the spun fiber.

Example 6

Figure 36:
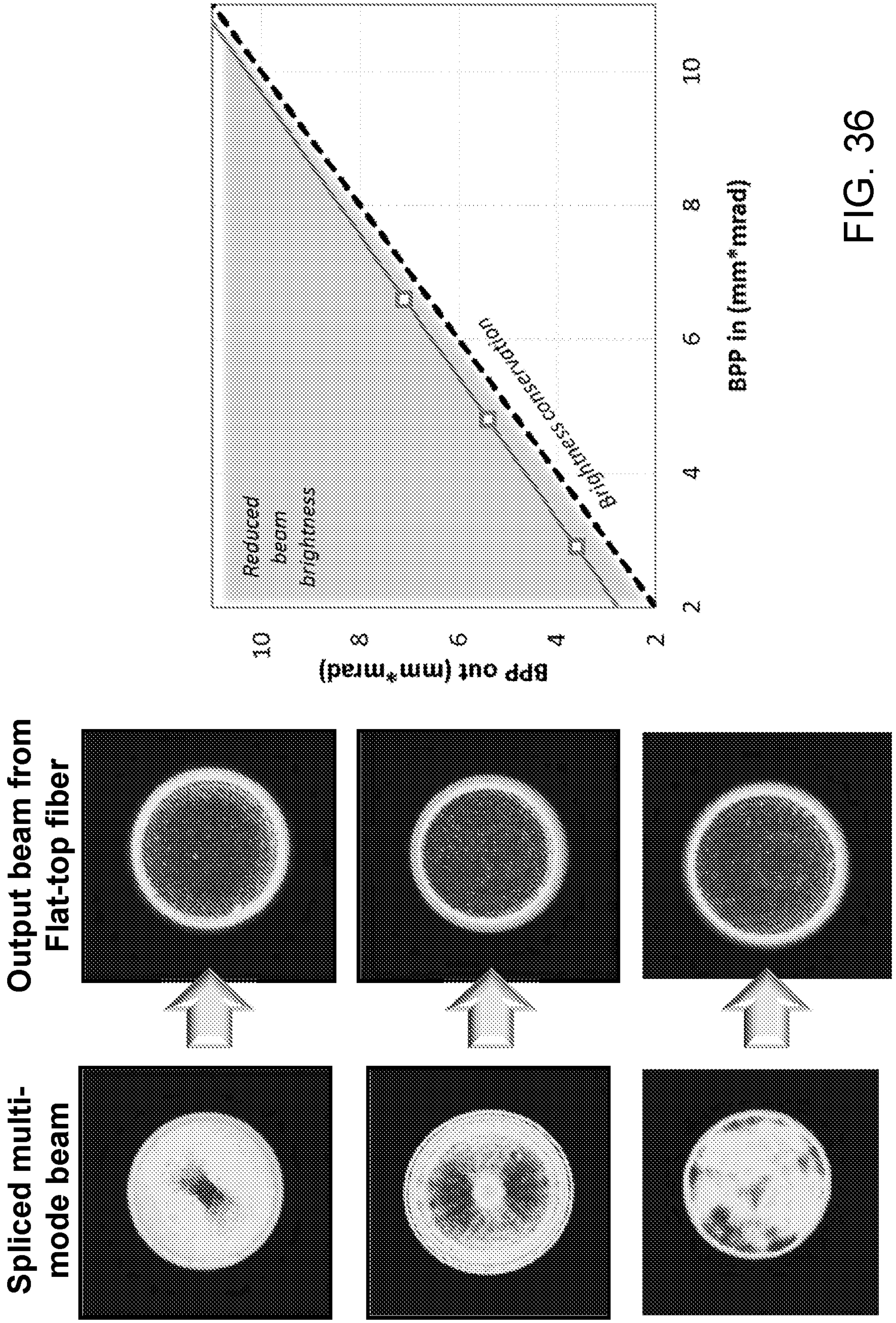
FIG. 36 is a set of images providing the results of the experiments described in Example 6.

In this example, various multimode fibers were spliced to a mode mixing fiber as described herein. In each case, the mode mixing fiber was 25 m long, and was otherwise similar to the mode mixing fiber of Example 3, but for the NA value of the down-doped ring being 0.05. The 2D beam intensities of the input multimode fiber and the output of the mode mixing fiber are provided in FIG. 36, and demonstrate that relatively inhomogeneous intensities in the input multimode fiber were converted to relatively flat-top intensities by the mode mixing fibers. The graph of FIG. 36 demonstrates that there is relatively little impact on beam brightness.

In the claims as well as in the specification above all transitional phrases such as "comprising", "including", "carrying", "having", "containing", "involving", and the like are understood to be open-ended. Only the transitional phrases "consisting of" and "consisting essentially of" shall be closed or semi-closed transitional phrases.

It is understood that the use of the term "a", "an" or "one" herein, including in the appended claims, is open ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instance herein is closed and hence limited to the singular. Similarly, the use of "a part of", "at least a part of" or similar phrases (e.g., "at least a portion of") shall not be taken to mean that the absence of such a phrase elsewhere is somehow limiting.

Subsequently reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutation, including, for example A without B; B without A, and A and B together, and as any other open recitation, does not exclude other features in addition to A and B.

Any of the features described above in conjunction with any one respect described above can be combined with a practice of the invention according to any other of the aspects described above, as is evident to one of ordinary skill who studies the disclosure herein.

Those of ordinary skill in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A mode mixing optical fiber for delivering optical radiation having a wavelength, the mode mixing optical fiber having a input end, an output end, a centerline and a refractive index profile, the mode mixing optical fiber comprising:

an innermost core for optical radiation having the wavelength, the innermost core having a substantially circular cross-sectional shape, the innermost core having a refractive index profile and a centerline, the centerline of the innermost core being positioned substantially collinearly with the centerline of the mode mixing optical fiber; and a cladding disposed about the innermost core, wherein the refractive index profile of the innermost core comprises one or more substantially doped regions disposed asymmetrically with respect to the centerline of the innermost core, each of the substantially doped regions being substantially up-doped or substantially down-doped, wherein the mode mixing optical fiber has at least thirty modes at the wavelength, wherein the refractive index profile of the innermost core is configured to distribute a fraction of the light input to the optical fiber at its input end from its lower-order modes to its higher-order modes as the light propagates toward the output end.

2. The mode mixing optical fiber according to claim 1, wherein there is no substantially down-doped region disposed symmetrically around the centerline of the innermost core.

3. The mode mixing optical fiber according to claim 1, wherein the one or more substantially doped regions includes one or more substantially down-doped regions.

4. The mode mixing optical fiber according to claim 1 wherein the one or more substantially doped regions disposed asymmetrically with respect to the centerline of the innermost core includes a singular annular shaped down-doped region, wherein the singular annular shaped down-doped region does not encompass the centerline of the innermost core.

5. The mode mixing optical fiber according to claim 4, wherein the annular shaped down-doped region is in the shape of a circular ring.

6. The mode mixing optical fiber according claim 4, wherein the annular shaped down-doped region has an inner diameter in the range of 5 microns to 20 microns and an annular thickness in the range of 0.5 microns to 3 microns.

7. The mode mixing optical fiber according to claim 4, wherein the refractive index of the annular shaped down-doped region is such that the relative numerical aperture value with respect to the remainder of the innermost core is in the range of 0.01 to 0.15.

8. The mode mixing optical fiber according to claim 1, wherein the one or more substantially doped regions includes one or more substantially up-doped regions.

9. The mode mixing optical fiber according to claim 8, wherein the cross-sectional profile of the mode mixing optical fiber is formed as a helix along the length thereof.

10. The mode mixing optical fiber according to claim 1, wherein the optical fiber has a length in the range of about 1 m to about 100 m.

11. The mode mixing optical fiber according to claim 1, in which the divergence of the mode mixing optical fiber is in the range of about 40 mrad to the numerical aperture of the innermost core.

12. The mode mixing optical fiber according to claim 1, configured to output a beam, as defined by an outer periphery at 5% of the peak intensity, having at least 80% of its cross-sectional area within about 15% of its average intensity, when the beam of radiation input to the mode mixing fiber, as defined by an outer periphery at 5% of the peak intensity, has its highest intensity at its center and no more than 50% of its cross-sectional within about 15% of its average intensity.

13. An optical system comprising:

a mode mixing optical fiber according to claim 1, the mode mixing optical fiber being configured for delivering optical radiation having a wavelength; and a first optical fiber having an output end directly optically coupled to the input end of the mode mixing optical fiber, the first optical fiber being configured to propagate optical radiation having the wavelength.

14. The optical system according to claim 13, wherein the first optical fiber is an active optical fiber of a fiber laser or fiber amplifier.

15. An optical system comprising:

a mode mixing optical fiber according to claim 1; and an optical source optically coupled to the input end of the first mode mixing optical fiber.

16. A method for providing guided radiation of a wavelength having a desired intensity profile, the method comprising coupling input radiation into a first end of a mode mixing fiber according to claim 1, and guiding the radiation along the mode mixing optical fiber to provide guided radiation having an intensity profile.

17. The method according to claim 16, wherein the input radiation, as defined by an outer periphery at 5% of the peak intensity, has its highest intensity at its center and has no more than 40% of its cross-sectional area within about 15% of its average intensity; and the guided radiation, as defined by an outer periphery at 5% of the peak intensity, has at least 80% of its cross-sectional area within about 15% of its average intensity.

18. The mode mixing optical fiber according to claim 1, wherein each of the one or more substantially doped regions has a refractive index that is in the range of about 0.005 to about 0.1 different than that of the remainder of the innermost core.

19. A mode mixing optical fiber for delivering optical radiation having a wavelength, the mode mixing optical fiber having a input end, an output end, a centerline and a refractive index profile, the mode mixing optical fiber comprising:

an innermost core for optical radiation having the wavelength, the innermost core having a substantially circular cross-sectional shape, the innermost core having a refractive index profile and a centerline, the centerline of the innermost core being positioned substantially collinearly with the centerline of the mode mixing optical fiber; and a cladding disposed about the innermost core, wherein the refractive index profile of the innermost core comprises a singular annular shaped down-doped region that does not encompass the centerline of the innermost core, and wherein the refractive index of the annular shaped down-doped region is such that the relative numerical aperture value with respect to the remainder of the innermost core is in the range of 0.01 to 0.15, wherein the mode mixing optical fiber has at least thirty modes at the wavelength, and wherein the refractive index profile of the innermost core is configured to distribute a fraction of the light input to the optical fiber at its input end from its lower-order modes to its higher-order modes as the light propagates toward the output end.

* * * * *